US012651905B2

(12) United States Patent
Wang et al.

(10) Patent No.: US 12,651,905 B2
(45) Date of Patent: Jun. 9, 2026

(54) GRID-TIED POWER SUPPLY SYSTEM AND RELATED DEVICE THEREOF

(71) Applicant: Huawei Digital Power Technologies Co., Ltd., Shenzhen (CN)

(72) Inventors: Shuchao Wang, Shanghai (CN); Xinyu Yu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/475,677

(22) Filed: Sep. 27, 2023

(65) Prior Publication Data

US 2024/0022074 A1     Jan. 18, 2024

Related U.S. Application Data

(63) Continuation of application No. PCT/CN2021/084464, filed on Mar. 31, 2021.

(51) Int. Cl.
*H02J 3/16*           (2026.01)

(52) U.S. Cl.
CPC ...................................... *H02J 3/16* (2013.01)

(58) Field of Classification Search
CPC ........................................................ H02J 3/16
See application file for complete search history.

(56) References Cited

U.S. PATENT DOCUMENTS

| | | | | | |
|---|---|---|---|---|---|
| 7,015,597 | B2 * | 3/2006 | Colby | ....................... | H02J 3/48 |
| | | | | | 702/65 |
| 9,954,370 | B2 * | 4/2018 | Takahashi | .................. | H02J 3/04 |
| 2012/0098346 | A1 * | 4/2012 | Garrity | ................... | H02J 3/381 |
| | | | | | 307/82 |

(Continued)

FOREIGN PATENT DOCUMENTS

| | | |
|---|---|---|
| CN | 104363102 A | 2/2015 |
| CN | 107516943 A | 12/2017 |
| CN | 107566921 A | 1/2018 |
| CN | 207475284 U | 6/2018 |
| CN | 207475772 U | 6/2018 |
| CN | 110190671 A | 8/2019 |
| WO | 2018205315 A1 | 11/2018 |

OTHER PUBLICATIONS

Sahoo Animesh K et al: "Communication-Less Primary and Secondary Control in Inverter-Interfaced AC Microgrid: An Overview", IEEE Journal of Emerging and Selected Topics in Power Electronics, IEEE, Piscataway, NJ, USA, vol. 9, No. 5, Feb. 14, 2020 (Feb. 14, 2020), pp. 5164-5182, XP011881003.

(Continued)

*Primary Examiner* — Ramsey Refai
(74) *Attorney, Agent, or Firm* — Conley Rose, P.C.

(57)          ABSTRACT

A grid-tied power supply system includes a controller and at least two inverters. One inverter is coupled to a plurality of power supply modules. The controller is configured to determine a power parameter. The inverter receives a power control packet through a communication transmission medium, determines target power based on the power parameter carried in the power control packet, and determines, based on the power control packet and/or the communication transmission medium, a target adjustment manner corresponding to the power control packet from at least two adjustment manners. The inverter further adjusts, to the target power in the target adjustment manner, power to be output by the inverter to an alternating-current (AC) power grid. The inverter can directly adjust power to be output by the grid-tied power supply system to the alternating-current power grid.

18 Claims, 9 Drawing Sheets

(56) References Cited

U.S. PATENT DOCUMENTS

| | | | |
|---|---|---|---|
| 2013/0077367 A1* | 3/2013 | Zhu | H02J 3/381 |
| | | | 323/205 |
| 2016/0111968 A1* | 4/2016 | Zou | H02M 5/458 |
| | | | 363/37 |
| 2022/0060015 A1* | 2/2022 | Capp | H02M 3/04 |
| 2023/0223758 A1* | 7/2023 | Quan | B60L 53/63 |
| | | | 307/9.1 |
| 2024/0305218 A1* | 9/2024 | Chen | H02M 1/123 |
| 2025/0023490 A1* | 1/2025 | Chen | H02J 3/381 |

OTHER PUBLICATIONS

Olivares Daniel E et al: "Trends in Microgrid Control", IEEE Transactions on Smart Grid. IEEE. USA vol. 5, No. 4, Jul. 1, 2014 (Jul. 1, 2014), pp. 1905-1919, XP011551526.

Sahoo Animesh K et al, "Communication-Less Primary and Secondary Control in Inverter-Interfaced AC Microgrid: An Overview", IEEE Journal of Emerging and Selected Topics in Power Electronics, IEEE, Piscataway, NJ, USA, vol. 9, No. 5, Feb. 14, 2020, 19 pages, XP011881003.

GB/T 29321-2012, Technical specification for reactive power compensation of PV power station, Dec. 31, 2012, with English translation, 5 pages.

Olivares Daniel E et al, "Trends in Microgrid Control", IEEE Transactions on Smart Grid.IEEE. USA, vol. 5, No. 4, Jul. 1, 2014, 15 pages, XP011551526.

GB/T 19964-2012, Technical requirements for connecting photovoltaic power station to power system, Dec. 31, 2012, with English translation, 7 pages.

* cited by examiner

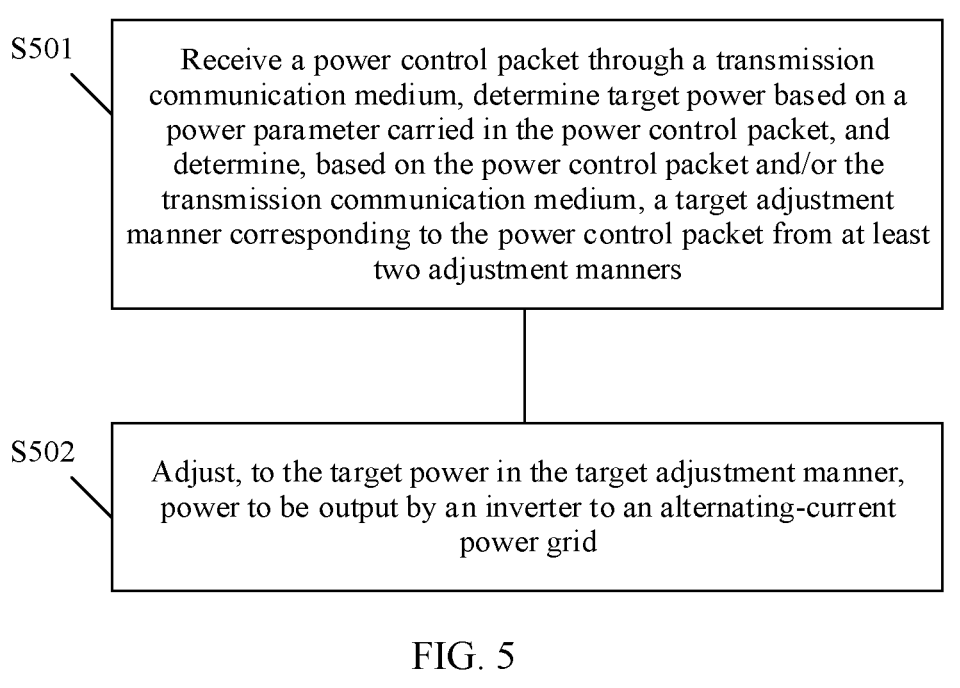

S501

Receive a power control packet through a transmission communication medium, determine target power based on a power parameter carried in the power control packet, and determine, based on the power control packet and/or the transmission communication medium, a target adjustment manner corresponding to the power control packet from at least two adjustment manners

S502

Adjust, to the target power in the target adjustment manner, power to be output by an inverter to an alternating-current power grid

FIG. 5

GRID-TIED POWER SUPPLY SYSTEM AND RELATED DEVICE THEREOF

CROSS-REFERENCE TO RELATED APPLICATIONS

This is a continuation of International Patent Application No. PCT/CN2021/084464 filed on Mar. 31, 2021, the disclosure of which is hereby incorporated by reference in its entirety.

TECHNICAL FIELD

This disclosure relates to the field of power supply technologies, and in particular, to a grid-tied power supply system and a related device thereof.

BACKGROUND

A proportion of new energy (for example, solar energy and wind energy) power generation in an alternating-current (AC) power grid greatly increases. However, the new energy power generation is subject to interference from many factors (for example, light and wind), a quantity of electric devices connected to the AC power grid is uncertain, and so on. As a result, electrical parameters of the AC power grid (for example, a voltage frequency of the power grid and a voltage amplitude of the power grid) are unstable.

For example, as shown in FIG. 1, a voltage frequency of a power grid fluctuates at a moment t1. A power supply system shown in FIG. 3 is usually used in other technologies. A scheduling master station disposed in a power station delivers an instruction to an automatic generation control (AGC)/automatic voltage control (AVC) system. The AGC/AVC system delivers, according to the instruction, active power information to each inverter through a communication device such as a switch or a subarray data collector, to adjust active power to be output by the inverter to an AC power grid.

For another example, as shown in FIG. 2, a voltage amplitude of the power grid drops at a moment t2. In the power supply system shown in FIG. 3, the scheduling master station delivers reactive power information to a static reactive power compensation generator (static volt-amps reactive (VAR) generator (SVG)), and the SVG device performs reactive power response, to adjust reactive power to be output by the inverter to the AC power grid, and recover the voltage amplitude of the power grid.

It can be learned that, in the power supply system in other technologies, reactive power is adjusted by the SVG device, and active power is adjusted by the inverter. In this adjustment manner, an additional SVG device needs to be added, and costs are high.

SUMMARY

Embodiments of this disclosure provide a grid-tied power supply system and a related device thereof. An inverter directly adjusts reactive power and active power that are to be output by the grid-tied power supply system to an AC power grid, so that an SVG device can be omitted, to reduce costs.

According to a first aspect, an embodiment of this disclosure provides a grid-tied power supply system. The grid-tied power supply system includes a controller and at least two inverters. One inverter is coupled to a plurality of power supply modules. The inverter may convert a direct current (DC) output by the power supply module into an AC, and transmit the AC to an AC power grid through a grid-tied point. The controller may determine a power parameter, for example, may determine the power parameter according to a received scheduling command, or may determine the power parameter based on an electrical parameter of the grid-tied point. The inverter receives a power control packet through a communication transmission medium, determines target power based on a power parameter carried in the power control packet, and determines, based on the power control packet and/or the communication transmission medium, a target adjustment manner corresponding to the power control packet from at least four adjustment manners. The target power includes target active power and/or target reactive power. The at least four adjustment manners include a first active power adjustment manner and a second active power adjustment manner that correspond to the target active power, and a first reactive power adjustment manner and a second reactive power adjustment manner that correspond to the target reactive power. The inverter adjusts, to the target active power or the target reactive power in the target adjustment manner, the power to be output by the inverter to the AC power grid.

In this embodiment of this disclosure, adjustment response time for adjusting, to the target active power in the first active power adjustment manner, the power to be output by the inverter to the AC power grid is less than adjustment response time for adjusting, to the target active power in the second active power adjustment manner, the power to be output by the inverter to the AC power grid; and adjustment response time for adjusting, to the target reactive power in the first reactive power adjustment manner, the power to be output by the inverter to the AC power grid is less than adjustment response time for adjusting, to the target reactive power in the second reactive power adjustment manner, the power to be output by the inverter to the AC power grid.

In this embodiment of this disclosure, the inverter may identify, based on the received power control packet, the target adjustment manner corresponding to the power control packet. When the target adjustment manner is the first reactive power adjustment manner, the adjustment response time for adjusting, by the inverter to the target reactive power, the power to be output by the inverter to the AC power grid can meet a requirement of a technical specification, and the inverter may further output the target active power to the AC power grid in the first active power adjustment manner, to support frequency modulation for the AC power grid within short time. During implementation of this embodiment of this disclosure, the inverter directly adjusts reactive power and active power that are to be output by the grid-tied power supply system to the AC power grid, so that an SVG device can be omitted, to reduce costs. In addition, power consumption during system operation can be further reduced, and frequency modulation can be implemented within short time.

With reference to the first aspect, in a first possible implementation, the power control packet is delivered by the controller to the inverter, and includes an active power control packet and/or a reactive power control packet. If the inverter receives the active power control packet through a first communication transmission medium, the inverter determines that a target adjustment manner corresponding to the active power control packet is the first active power adjustment manner; or if the inverter receives the active power control packet through a second communication transmission medium, the inverter determines that a target adjustment manner corresponding to the active power control packet is the second active power adjustment manner. If the inverter receives the reactive power control packet through the first communication transmission medium, the inverter determines that a target adjustment manner corresponding to the reactive power control packet is the first reactive power adjustment manner; or if the inverter receives the reactive power control packet through the second communication transmission medium, the inverter determines that a target adjustment manner corresponding to the reactive power control packet is the second reactive power adjustment manner. During implementation of this embodiment of this disclosure, the inverter may determine, based on the communication transmission medium through which the power control packet is received, the target adjustment manner corresponding to the power control packet.

With reference to the first aspect, in a second possible implementation, the power control packet is delivered by the controller to the inverter, and includes an active power control packet and/or a reactive power control packet. If the inverter receives the active power control packet and a packet format of the active power control packet is a first packet format, the inverter determines that a target adjustment manner corresponding to the active power control packet is the first active power adjustment manner; or if a packet format of the active power control packet is a second packet format, the inverter determines that a target adjustment manner corresponding to the active power control packet is the second active power adjustment manner. If the inverter receives the reactive power control packet and a packet format of the reactive power control packet is the first packet format, the inverter determines that a target adjustment manner corresponding to the reactive power control packet is the first reactive power adjustment manner; or if a packet format of the reactive power control packet is the second packet format, the inverter determines that a target adjustment manner corresponding to the reactive power control packet is the second reactive power adjustment manner. During implementation of this embodiment of this disclosure, the inverter may determine, based on the packet format of the received power control packet, the target adjustment manner corresponding to the power control packet.

With reference to the first aspect, in a third possible implementation, the power control packet is delivered by the controller to the inverter, and includes an active power control packet and/or a reactive power control packet. If the inverter receives the active power control packet and the active power control packet carries a first packet identifier, the inverter determines that a target adjustment manner corresponding to the active power control packet is the first active power adjustment manner; or if the active power control packet carries a second packet identifier, the inverter determines that a target adjustment manner corresponding to the active power control packet is the second active power adjustment manner. If the inverter receives the reactive power control packet and the reactive power control packet carries the first packet identifier, the inverter determines that a target adjustment manner corresponding to the reactive power control packet is the first reactive power adjustment manner; or if the reactive power control packet carries the second packet identifier, the inverter determines that a target adjustment manner corresponding to the reactive power control packet is the second reactive power adjustment manner. During implementation of this embodiment of this disclosure, the inverter may determine, based on the packet identifier carried in the received power control packet, the target adjustment manner corresponding to the power control packet.

With reference to the first aspect or with reference to any one of the foregoing possible implementations of the first aspect, in a fourth possible implementation, when determining that the target adjustment manner is the first active power adjustment manner, the inverter determines a first active current based on the target active power and a correspondence between active power and an active current, and adjusts, to the target active power based on the first active current, the power to be output by the inverter to the AC power grid. During implementation of this embodiment of this disclosure, the inverter can quickly respond to adjustment of active power.

With reference to the first aspect or with reference to any one of the foregoing possible implementations of the first aspect, in a fifth possible implementation, the power parameter includes first active power, the target active power is determined by the inverter based on the first active power and current maximum active output power of the inverter, and the current maximum active output power of the inverter is determined by the inverter based on current environment information of the power supply module and a correspondence between maximum active output power and environment information.

With reference to the first aspect or with reference to the first possible implementation to the third possible implementation of the first aspect, in a sixth possible implementation, when determining that the target adjustment manner is the first reactive power adjustment manner, the inverter determines a first reactive current based on the target reactive power and a correspondence between reactive power and a reactive current, and adjusts, to the target reactive power based on the first reactive current, the power to be output by the inverter to the AC power grid. During implementation of this embodiment of this disclosure, the inverter can quickly respond to adjustment of reactive power.

With reference to the first aspect or with reference to the first possible implementation to the third possible implementation of the first aspect, in a seventh possible implementation, when determining that the target adjustment manner is the second active power adjustment manner, the inverter determines a second active current based on the target active power and reference active power, and adjusts, to the target active power based on the second active current, the power to be output by the inverter to the AC power grid.

With reference to the first aspect or with reference to the first possible implementation to the third possible implementation of the first aspect, in an eighth possible implementation, when determining that the target adjustment manner is the second reactive power adjustment manner, the inverter determines a second reactive current based on the target reactive power and reference reactive power, and adjusts, to the target reactive power based on the second reactive current, the power to be output by the inverter to the AC power grid.

With reference to the first aspect, in a ninth possible implementation, the power control packet is a second power control packet, and the grid-tied power supply system further includes a communication interface module. The communication interface module may receive the first power control packet delivered by the controller, convert the first power control packet into the second power control packet, and send the second power control packet to the inverter. A packet format of the first power control packet is different from that of the second power control packet.

With reference to the ninth possible implementation of the first aspect, in a tenth possible implementation, the second power control packet includes a second active power control packet and/or a second reactive power control packet. If the inverter receives the second active power control packet from the communication interface module, the inverter determines that a target adjustment manner corresponding to the second active power control packet is the first active power adjustment manner. If the inverter receives the second reactive power control packet from the communication interface module, the inverter determines that a target adjustment manner corresponding to the second reactive power control packet is the first reactive power adjustment manner. In this embodiment of this disclosure, the communication interface module is added to the grid-tied power supply system. The communication interface module may perform packet format conversion on the first power control packet delivered by the controller, to convert the first power control packet into the second power control packet that can be identified by the inverter. Provided that the inverter receives the second power control packet from the communication interface module, the inverter can determine that the target adjustment manner corresponding to the second power control packet is the first adjustment manner. During implementation of this embodiment of this disclosure, compatibility of the grid-tied power supply system can be improved, and applicability is high.

With reference to the ninth possible implementation of the first aspect, in an eleventh possible implementation, the first power control packet is received by the communication interface module through a communication transmission medium. The communication interface module determines, based on the first power control packet and/or the communication transmission medium, a target adjustment manner corresponding to the first power control packet from the at least four adjustment manners. The communication interface module may generate an adjustment identifier, and send the second power control packet carrying the adjustment identifier to the inverter. The adjustment identifier is used to determine a target adjustment manner corresponding to the second power control packet.

With reference to the eleventh possible implementation of the first aspect, in a twelfth possible implementation, the first power control packet includes a first active power control packet and/or a first reactive power control packet. If the communication interface module receives the first active power control packet through a third communication transmission medium, the communication interface module determines that a target adjustment manner corresponding to the first active power control packet is the first active power adjustment manner; or if the communication interface module receives the first active power control packet through a fourth communication transmission medium, the communication interface module determines that a target adjustment manner corresponding to the first active power control packet is the second active power adjustment manner. If the communication interface module receives the first reactive power control packet through the third communication transmission medium, the communication interface module determines that a target adjustment manner corresponding to the first reactive power control packet is the first reactive power adjustment manner; or if the communication interface module receives the first reactive power control packet through the fourth communication transmission medium, the communication interface module determines that a target adjustment manner corresponding to the first reactive power control packet is the second reactive power adjustment manner. During implementation of this embodiment of this disclosure, the communication interface module may determine, based on the communication transmission medium through which the power control packet is received, the target adjustment manner corresponding to the power control packet.

With reference to the eleventh possible implementation of the first aspect, in a thirteenth possible implementation, the first power control packet includes a first active power control packet and/or a first reactive power control packet. If the communication interface module receives the first active power control packet and a packet format of the first active power control packet is a first packet format, the communication interface module determines that a target adjustment manner corresponding to the first active power control packet is the first active power adjustment manner; or if a packet format of the first active power control packet is a second packet format, the communication interface module determines that a target adjustment manner corresponding to the first active power control packet is the second active power adjustment manner. If the communication interface module receives the first reactive power control packet and a packet format of the first reactive power control packet is the first packet format, the communication interface module determines that a target adjustment manner corresponding to the first reactive power control packet is the first reactive power adjustment manner; or if a packet format of the first reactive power control packet is the second packet format, the communication interface module determines that a target adjustment manner corresponding to the first reactive power control packet is the second reactive power adjustment manner. During implementation of this embodiment of this disclosure, the communication interface module may determine, based on the packet format of the received power control packet, the target adjustment manner corresponding to the power control packet.

With reference to the eleventh possible implementation of the first aspect, in a fourteenth possible implementation, the first power control packet includes a first active power control packet and/or a first reactive power control packet. If the communication interface module receives the first active power control packet and the first active power control packet carries a first packet identifier, the communication interface module determines that a target adjustment manner corresponding to the first active power control packet is the first active power adjustment manner; or if the first active power control packet carries a second packet identifier, the communication interface module determines that a target adjustment manner corresponding to the first active power control packet is the second active power adjustment manner. If the communication interface module receives the first reactive power control packet and the first reactive power control packet carries the first packet identifier, the communication interface module determines that a target adjustment manner corresponding to the first reactive power control packet is the first reactive power adjustment manner; or if the first reactive power control packet carries the second packet identifier, the communication interface module determines that a target adjustment manner corresponding to the first reactive power control packet is the second reactive power adjustment manner. During implementation of this embodiment of this disclosure, the communication interface module may determine, based on the packet identifier carried in the received power control packet, the target adjustment manner corresponding to the power control packet.

According to a second aspect, an embodiment of this disclosure provides an inverter. The inverter is applicable to a grid-tied power supply system. The grid-tied power supply system includes the inverter and a controller. The inverter is coupled to a plurality of power supply modules, and may convert a DC output by the power supply module into an AC, and transmit the AC to an AC power grid through a grid-tied point. The controller may determine a power parameter according to a received scheduling command, or determine a power parameter based on an electrical parameter of the grid-tied point. The inverter receives a power control packet through a communication transmission medium, determines target power based on a power parameter carried in the power control packet, and determines, based on the power control packet and/or the communication transmission medium, a target adjustment manner corresponding to the power control packet from at least four adjustment manners. The target power includes target active power and/or target reactive power. The at least four adjustment manners include a first active power adjustment manner and a second active power adjustment manner that correspond to the target active power, and a first reactive power adjustment manner and a second reactive power adjustment manner that correspond to the target reactive power. The inverter adjusts, to the target active power or the target reactive power in the target adjustment manner, the power to be output by the inverter to the AC power grid.

With reference to the second aspect, in a first possible implementation, the power control packet is received by the inverter from the controller, and includes an active power control packet and/or a reactive power control packet. If the inverter receives the active power control packet through a first communication transmission medium, the inverter determines that a target adjustment manner corresponding to the active power control packet is the first active power adjustment manner; or if the inverter receives the active power control packet through a second communication transmission medium, the inverter determines that a target adjustment manner corresponding to the active power control packet is the second active power adjustment manner. If the inverter receives the reactive power control packet through the first communication transmission medium, the inverter determines that a target adjustment manner corresponding to the reactive power control packet is the first reactive power adjustment manner; or if the inverter receives the reactive power control packet through the second communication transmission medium, the inverter determines that a target adjustment manner corresponding to the reactive power control packet is the second reactive power adjustment manner.

With reference to the second aspect, in a second possible implementation, the power control packet is received by the inverter from the controller, and includes an active power control packet and/or a reactive power control packet. If the inverter receives the active power control packet and a packet format of the active power control packet is a first packet format, the inverter determines that a target adjustment manner corresponding to the active power control packet is the first active power adjustment manner; or if a packet format of the active power control packet is a second packet format, the inverter determines that a target adjustment manner corresponding to the active power control packet is the second active power adjustment manner. If the inverter receives the reactive power control packet and a packet format of the reactive power control packet is the first packet format, the inverter determines that a target adjustment manner corresponding to the reactive power control packet is the first reactive power adjustment manner; or if a packet format of the reactive power control packet is the second packet format, the inverter determines that a target adjustment manner corresponding to the reactive power control packet is the second reactive power adjustment manner.

With reference to the second aspect, in a third possible implementation, the power control packet is received by the inverter from the controller, and includes an active power control packet and/or a reactive power control packet. If the inverter receives the active power control packet and the active power control packet carries a first packet identifier, the inverter determines that a target adjustment manner corresponding to the active power control packet is the first active power adjustment manner; or if the active power control packet carries a second packet identifier, the inverter determines that a target adjustment manner corresponding to the active power control packet is the second active power adjustment manner. If the inverter receives the reactive power control packet and the reactive power control packet carries the first packet identifier, the inverter determines that a target adjustment manner corresponding to the reactive power control packet is the first reactive power adjustment manner; or if the reactive power control packet carries the second packet identifier, the inverter determines that a target adjustment manner corresponding to the reactive power control packet is the second reactive power adjustment manner.

With reference to the second aspect or with reference to any one of the foregoing possible implementations of the second aspect, in a fourth possible implementation, when determining that the target adjustment manner is the first active power adjustment manner, the inverter determines a first active current based on the target active power and a correspondence between active power and an active current, and adjusts, to the target active power based on the first active current, the power to be output by the inverter to the AC power grid.

With reference to the second aspect or with reference to any one of the foregoing possible implementations of the second aspect, in a fifth possible implementation, the power parameter includes first active power, the inverter determines current maximum active output power of the inverter based on current environment information of the power supply module and a correspondence between maximum active output power and environment information, and the inverter determines the target active power based on the first active power and the current maximum active output power of the inverter.

With reference to the second aspect or with reference to the first possible implementation to the third possible implementation of the second aspect, in a sixth possible implementation, when determining that the target adjustment manner is the first reactive power adjustment manner, the inverter determines a first reactive current based on the target reactive power and a correspondence between reactive power and a reactive current, and adjusts, to the target reactive power based on the first reactive current, the power to be output by the inverter to the AC power grid.

With reference to the second aspect or with reference to the first possible implementation to the third possible implementation of the second aspect, in a seventh possible implementation, when determining that the target adjustment manner is the second active power adjustment manner, the inverter determines a second active current based on the target active power and reference active power, and adjusts, to the target active power based on the second active current, the power to be output by the inverter to the AC power grid.

With reference to the second aspect or with reference to the first possible implementation to the third possible implementation of the second aspect, in an eighth possible implementation, when determining that the target adjustment manner is the second reactive power adjustment manner, the inverter determines a second reactive current based on the target reactive power and reference reactive power, and adjusts, to the target reactive power based on the second reactive current, the power to be output by the inverter to the AC power grid.

According to a third aspect, an embodiment of this disclosure provides a communication interface module. The communication interface module is applicable to a grid-tied power supply system. The grid-tied power supply system includes at least two inverters, the communication interface module, and a controller. One inverter is coupled to a plurality of power supply modules. The inverter may convert a DC output by the power supply module into an AC, and transmit the AC to an AC power grid through a grid-tied point. The controller may determine a power parameter according to a received scheduling command, or determine a power parameter based on an electrical parameter of the grid-tied point. The communication interface module receives the first power control packet delivered by the controller, convert the first power control packet into the second power control packet, and send the second power control packet to the inverter. A packet format of the first power control packet is different from that of the second power control packet.

With reference to the third aspect, in a first possible implementation, the communication interface module receives the first power control packet through a communication transmission medium. The communication interface module may determine, based on the first power control packet and/or the communication transmission medium, a target adjustment manner corresponding to the first power control packet from at least four adjustment manners. The communication interface module generates an adjustment identifier, and sends a second power control packet carrying the adjustment identifier to the inverter. The adjustment identifier is used to determine a target adjustment manner corresponding to the second power control packet.

With reference to the first possible implementation of the third aspect, in a second possible implementation, the first power control packet includes a first active power control packet and/or a first reactive power control packet. If the communication interface module receives the first active power control packet through a third communication transmission medium, the communication interface module determines that a target adjustment manner corresponding to the first active power control packet is the first active power adjustment manner; or if the communication interface module receives the first active power control packet through a fourth communication transmission medium, the communication interface module determines that a target adjustment manner corresponding to the first active power control packet is the second active power adjustment manner. If the communication interface module receives the first reactive power control packet through the third communication transmission medium, the communication interface module determines that a target adjustment manner corresponding to the first reactive power control packet is the first reactive power adjustment manner; or if the communication interface module receives the first reactive power control packet through the fourth communication transmission medium, the communication interface module determines that a target adjustment manner corresponding to the first reactive power control packet is the second reactive power adjustment manner.

With reference to the first possible implementation of the third aspect, in a third possible implementation, the first power control packet includes a first active power control packet and/or a first reactive power control packet.

If the communication interface module receives the first active power control packet and a packet format of the first active power control packet is a first packet format, the communication interface module determines that a target adjustment manner corresponding to the first active power control packet is the first active power adjustment manner; or if a packet format of the first active power control packet is a second packet format, the communication interface module determines that a target adjustment manner corresponding to the first active power control packet is the second active power adjustment manner. If the communication interface module receives the first reactive power control packet and a packet format of the first reactive power control packet is the first packet format, the communication interface module determines that a target adjustment manner corresponding to the first reactive power control packet is the first reactive power adjustment manner; or if a packet format of the first reactive power control packet is the second packet format, the communication interface module determines that a target adjustment manner corresponding to the first reactive power control packet is the second reactive power adjustment manner.

With reference to the first possible implementation of the third aspect, in a fourth possible implementation, the first power control packet includes a first active power control packet and/or a first reactive power control packet. If the communication interface module receives the first active power control packet and the first active power control packet carries a first packet identifier, the communication interface module determines that a target adjustment manner corresponding to the first active power control packet is the first active power adjustment manner; or if the first active power control packet carries a second packet identifier, the communication interface module determines that a target adjustment manner corresponding to the first active power control packet is the second active power adjustment manner. If the communication interface module receives the first reactive power control packet and the first reactive power control packet carries the first packet identifier, the communication interface module determines that a target adjustment manner corresponding to the first reactive power control packet is the first reactive power adjustment manner; or if the first reactive power control packet carries the second packet identifier, the communication interface module determines that a target adjustment manner corresponding to the first reactive power control packet is the second reactive power adjustment manner.

It should be understood that mutual reference may be made between implementations and benefits of the foregoing plurality of aspects of this disclosure.

BRIEF DESCRIPTION OF DRAWINGS

FIG. 5 is a schematic diagram of a process of adjusting, by an inverter, power to be output by the inverter to an AC power grid according to an embodiment of this disclosure.

DESCRIPTION OF EMBODIMENTS

The following clearly describes technical solutions in embodiments of this disclosure with reference to accompanying drawings in embodiments of this disclosure. Clearly, the described embodiments are some but not all of embodiments of this disclosure. All other embodiments obtained by a person of ordinary skill in the art based on embodiments of this disclosure without creative efforts shall fall within the protection scope of this disclosure.

The following further describes embodiments of this disclosure in detail with reference to accompanying drawings.

Figure 4:
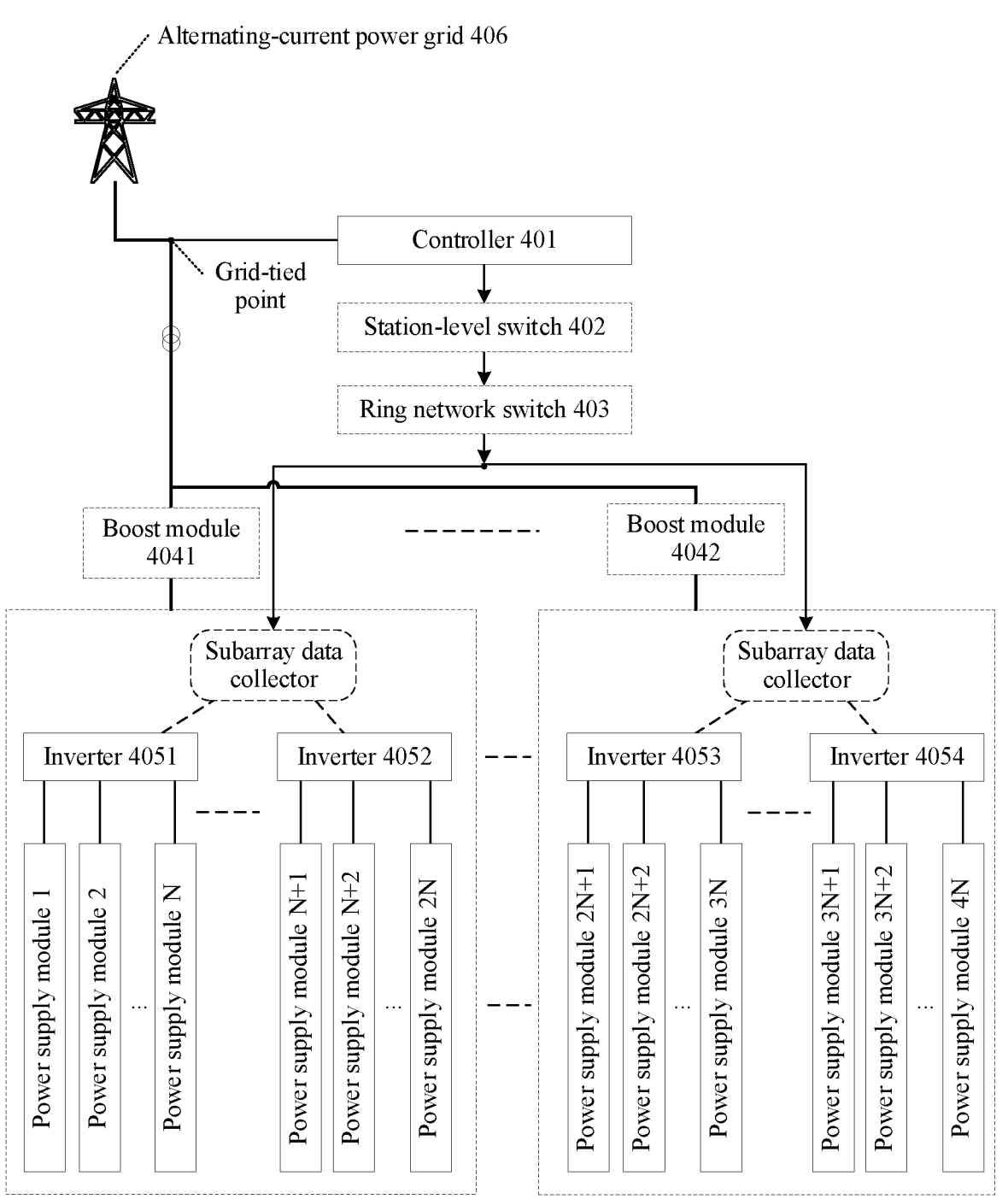
FIG. 4 is a block diagram of a structure of a grid-tied power supply system according to an embodiment of this disclosure.

FIG. 4 is a system block diagram of a grid-tied power supply system according to an embodiment of this disclosure. As shown in FIG. 4, the grid-tied power supply system includes a controller 401 and at least two inverters (for example, an inverter 4051, an inverter 4052, and an inverter 4053). One inverter is coupled to N power supply modules, where N is greater than 2. The inverter converts DCs output by the N power supply modules into ACs, and transmits the ACs to an AC power grid 406 through a grid-tied point.

The controller 401 is located in a power station, and may receive a scheduling command or monitor an electrical parameter of the grid-tied point, and determine a power parameter according to the scheduling command or based on the electrical parameter of the grid-tied point. For example, the scheduling command includes an entire-station active power instruction or an entire-station reactive power instruction of the power station in which the controller 401 is located, the electrical parameter includes a voltage amplitude and a voltage frequency, and the power parameter includes target active power and target reactive power. In some feasible implementations, the scheduling command may be delivered by another controller in the power station in which the controller 401 is located, may be delivered by a scheduling master station of the entire AC power grid, may be delivered by a billing system of the AC power grid, or the like. A source of the scheduling command is not limited in this embodiment of this disclosure.

In some feasible implementations, when detecting that the voltage amplitude of the grid-tied point is less than a preset voltage threshold, the controller 401 calculates a reactive power variation corresponding to recovery of the voltage amplitude of the grid-tied point to a target voltage amplitude in this case, and calculates total target reactive power based on the reactive power variation and reactive power currently output by the grid-tied power supply system. The target voltage amplitude is not less than the preset voltage threshold. For example, the voltage amplitude of the grid-tied point is normally 220 kilovolts (kV). When the voltage of the grid-tied point is less than 210 kV, the controller 401 calculates a reactive power variation corresponding to recovery of the voltage of the grid-tied point to 220 kV in this case.

Optionally, in some feasible implementations, the scheduling command received by the controller 401 carries a reactive power variation or a reactive power variation proportion. In this case, the controller may directly calculate the total target reactive power based on the reactive power variation or the reactive power variation proportion and reactive power currently output by the grid-tied power supply system.

For example, the controller 401 may evenly distribute the total target reactive power based on a quantity of inverters in the grid-tied power supply system, to determine the target reactive power, for example, 10 megavolt-ampere reactive (MVAR). That is, the power parameter determined by the controller 401 may be a specific power value. Optionally, the controller 401 may determine a reactive power variation of each inverter based on the target reactive power and reactive power currently output by each inverter.

For another example, the controller 401 may determine a reactive power output proportion of each inverter, for example, 30%, based on the total target reactive power and historical reactive power output by each inverter. That is, the power parameter determined by the controller 401 may be a proportion value. Further, the controller 401 may determine a proportion value of a reactive power variation of each inverter based on a reactive power variation of each inverter and reactive power currently output by each inverter.

Optionally, in some feasible implementations, when detecting that the voltage frequency of the grid-tied point deviates from a preset frequency, for example, 50 hertz (Hz), the controller 401 calculates, based on a preset frequency adjustment ratio formula, an active power variation output by the grid-tied power supply system in this case, and calculates total target active power based on the active power variation and active power currently output by the grid-tied power supply system.

Optionally, in some feasible implementations, the scheduling command received by the controller 401 carries an active power variation or an active power variation proportion. In this case, the controller may directly calculate the total target active power based on the active power variation or the active power variation proportion and active power currently output by the grid-tied power supply system.

For example, the controller 401 may evenly distribute the total target active power based on a quantity of inverters in the grid-tied power supply system, to determine the target active power. In this case, the power parameter is a specific power value, and may be the target active power or the active power variation. For another example, the controller 401 may determine an active power output proportion of each inverter based on total active power and historical active power output by each inverter. In this case, the power parameter is a proportion value, and may be the active power output proportion or a proportion value of the active power variation.

The controller 401 transfers the power parameter to each inverter through a switch. For example, the grid-tied power supply system further includes a station-level switch 402 and a ring network switch 403. The controller 401 transfers the power parameter to the ring network switch 403 through the station-level switch 402, and the ring network switch 403 may transfer the power parameter to each inverter. Optionally, the station-level switch 402 is located in the power station. The ring network switch 403 is located between the power station and each inverter to improve reliability of system communication. It can be understood that, in FIG. 4, an example in which the controller 401 communicates with each inverter through two levels of switches is used. Communication between the controller 401 and each inverter may alternatively be established through three or more levels of switches based on a distance between the controller 401 and the inverter. A quantity of levels of switches is not limited in this disclosure.

In some feasible implementations, communication between the ring network switch 403 and each inverter may be established through a subarray data collector, and one subarray data collector may correspond to a plurality of inverters. It can be understood that the subarray data collector provided in this embodiment of this disclosure is an intermediate communication apparatus, and may collect and transmit data of each inverter. For example, the subarray data collector may be connected to each inverter through Ethernet or a serial interface such as RS-485, RS-232, or PLC, and a supported communication mode includes but is not limited to Ethernet GOOSE, User Datagram Protocol (UDP), Transmission Control Protocol (TCP), bus communication (for example, Controller Area Network (CAN), EtherCat, or Profibus), analog communication, and the like.

Optionally, in some feasible implementations, communication between the subarray data collector and each inverter may be wireless communication, including but not limited to a ZigBee wireless communication technology, a third-generation mobile communication technology (3G), a fourth-generation mobile communication technology (4G), a fifth-generation mobile communication technology (5G), and the like.

Further, communication between the subarray data collector and each inverter may include both wired communication and wireless communication. For example, the subarray data collector establishes a wired connection to a 5G communication base station, and each inverter establishes a wireless connection to the 5G communication base station. The foregoing describes non-exhaustive examples of communication modes between the subarray data collector and the inverter. Communication between the subarray data collector and the inverter is not limited in this embodiment of this disclosure.

In some feasible implementations, the grid-tied power supply system may further include at least two boost modules (for example, a boost module 4041 and a boost module 4042). One boost module may be correspondingly coupled to a plurality of inverters, or may be correspondingly coupled to one inverter. A correspondence between the boost module and the inverter is not limited in this disclosure.

Each boost module may correspondingly increase an AC voltage to be output by an inverter coupled to the boost module. For example, the boost module may be a box-type transformer. Optionally, the grid-tied power supply system provided in this embodiment of this disclosure is applied to a photovoltaic scenario. The inverter may be a string photovoltaic inverter, a centralized photovoltaic inverter, a distributed photovoltaic inverter, a bidirectional photovoltaic inverter, an energy storage power conversion system (PCS), or the like. For example, the photovoltaic inverter includes a boost module. In other words, the photovoltaic inverter and the boost module may be a same device.

Any inverter in the grid-tied power supply system (referred to as an inverter in this embodiment of this disclosure for ease of description) has a communication function and a control function. During specific implementation, the inverter may communicate with the switch through the subarray data collector, and receive a power control packet. The power control packet may be delivered by the controller 401 to the inverter, or may be a second power control packet delivered by another module such as a communication interface module in the grid-tied power supply system. The second power control packet is obtained by the communication interface module by performing format conversion on a first power control packet delivered by the controller 401.

The power control packet carries a power parameter determined by the controller 401. The inverter may determine, based on the power parameter, target power to be output by the inverter to the AC power grid. The target power includes target active power and/or target reactive power. For example, the target reactive power may be a proportion value, for example, 30%. When receiving a power control packet carrying the target reactive power, each inverter uses 30% of current maximum reactive output power of the inverter as target reactive power to be output by the inverter to the AC power grid. For another example, the target reactive power may be a specific power value, for example, 10 MVAR. When receiving a power control packet carrying the target reactive power, each inverter uses, as target reactive power to be output by the inverter to the AC power grid, a power value corresponding to the target reactive power.

For example, the target active power may be a proportion value, for example, 30%. When receiving a power control packet carrying the target active power, each inverter uses 30% of current maximum active output power of the inverter as target active power to be output by the inverter to the AC power grid. When the target active power is a specific power value, when receiving a power control packet carrying the target active power, each inverter may use, as target active power, a smaller value of current maximum active output power of the inverter and a power value corresponding to the target active power.

The inverter may further determine, based on the power control packet, a target adjustment manner corresponding to the inverter. Different adjustment manners correspond to different adjustment response time when the power to be output by the inverter to the AC power grid is the target active power or the target reactive power. It should be noted that the adjustment response time is time for adjusting, to 90% of the target active power value, a value of power to be output by the inverter to the AC power grid, or time for adjusting, to 90% of the target reactive power value, a value of power to be output by the inverter to the AC power grid.

The grid-tied power supply system provided in this embodiment of this disclosure is applicable to a photovoltaic power station, an energy storage power station, a wind farm, a microgrid, and/or a hydropower station, or a hybrid power station including the foregoing power stations, or the like.

For example, embodiments of this disclosure are applied to a photovoltaic power station. The State Grid Corporation of China formulates GB/T 29321-2012 Technical specification for reactive power compensation of a photovoltaic power station. In the technical specification for reactive power compensation, it is required that reactive power response time of a photovoltaic power station be less than or equal to 30 milliseconds (ms). The technical specification is understood with reference to FIG. 2. To be specific, a voltage at a grid-tied point starts to drop at a moment t2, a controller determines target reactive power, an inverter adjusts, based on the target reactive power, power to be output to an AC power grid, and the AC power grid may recover to a target voltage (to be specific, a value of power output by the inverter is 90% of the target reactive power value) at a moment t3, where a time interval between t3 and t2 is not greater than 30 ms. In other technologies, to meet the technical specification, an SVG device with high costs and high-power consumption is used to perform reactive power compensation.

In embodiments of this disclosure, the inverter may identify, based on the received power control packet, the target adjustment manner corresponding to the power control packet. When the target adjustment manner is a first reactive power adjustment manner, adjustment response time for adjusting, by the inverter to the target reactive power, the power to be output by the inverter to the AC power grid can meet a requirement of the technical specification, and the inverter may further output the target active power to the AC power grid in the first active power adjustment manner, to support frequency modulation for the AC power grid within short time. During implementation of embodiments of this disclosure, the inverter directly adjusts reactive power and active power that are to be output by the grid-tied power supply system to the AC power grid, so that an SVG device can be omitted, to reduce costs. In addition, power consumption during system operation can be further reduced, and frequency modulation can be implemented within short time.

Figure 6:
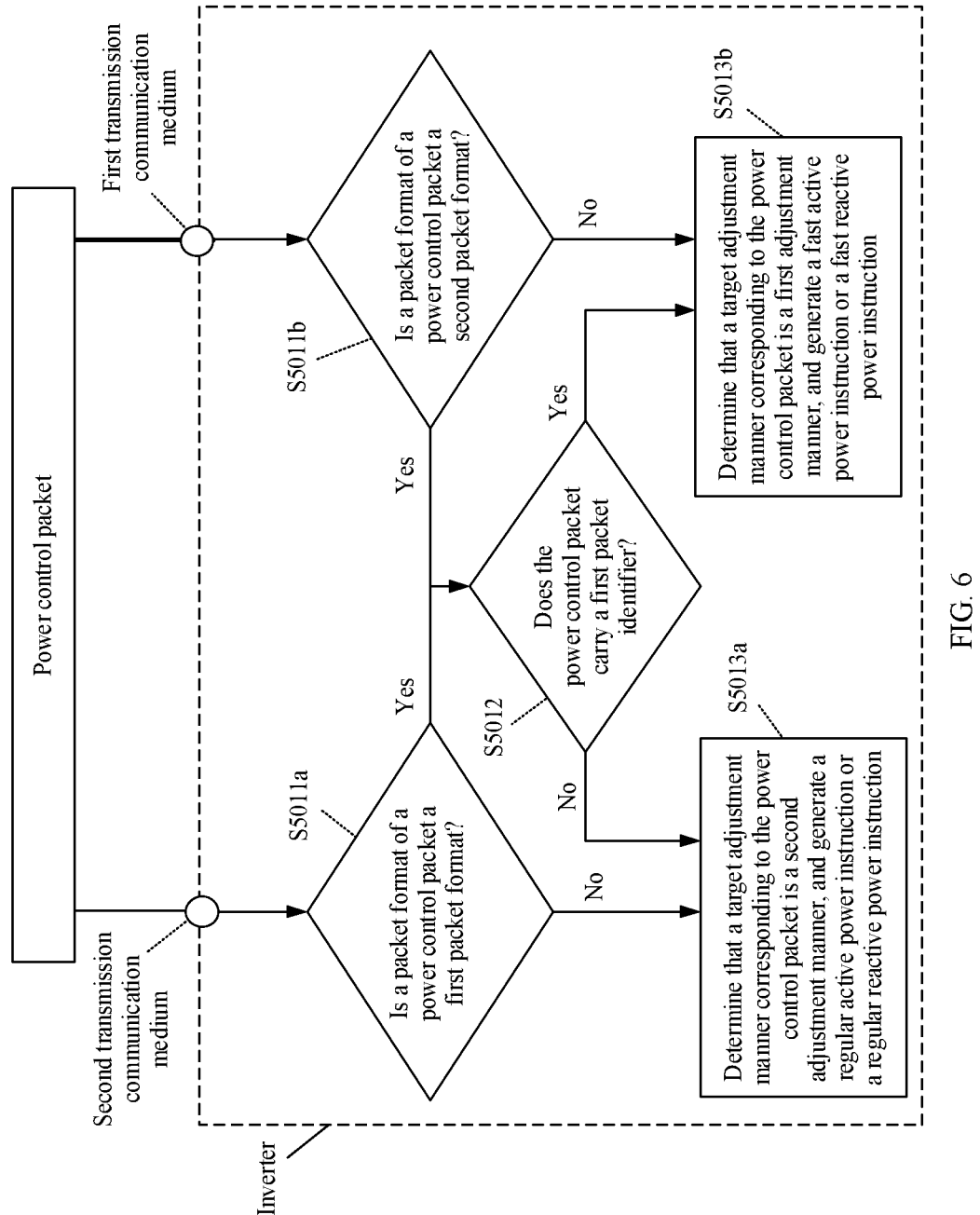
FIG. 6 is a schematic diagram of a process of determining an adjustment manner by an inverter according to an embodiment of this disclosure.
Figure 7:
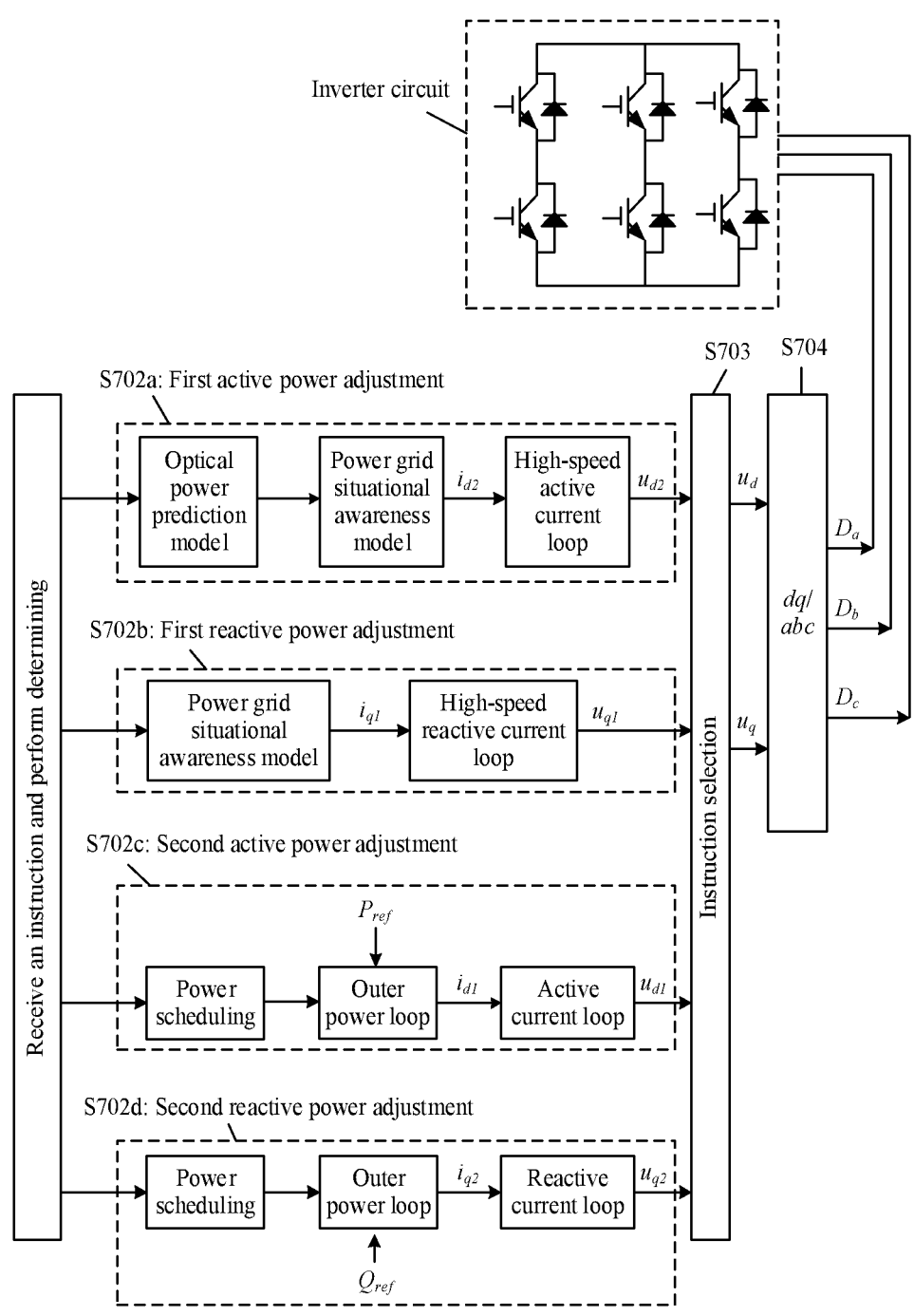
FIG. 7 is a schematic diagram of a process of implementing power adjustment by an inverter according to an embodiment of this disclosure.

With reference to FIG. 5 to FIG. 7, the following describes an inverter provided in embodiments of this disclosure.

First, FIG. 5 is a schematic diagram of a process of adjusting, by an inverter, power to be output by the inverter to an AC power grid according to an embodiment of this disclosure. As shown in FIG. 5, specific steps of adjusting, by the inverter, the power to be output by the inverter to the AC power grid include the following steps.

S501: The inverter receives a power control packet through a communication transmission medium, determines target power based on a power parameter carried in the power control packet, and determines, based on the power control packet and/or the communication transmission medium, a target adjustment manner corresponding to the power control packet from at least two adjustment manners. The at least two adjustment manners include a first adjustment manner and a second adjustment manner.

It should be noted that a grid-tied power supply system includes at least two inverters, and power control packets received by the inverters are the same.

The power parameter is determined by a controller, may be determined by the controller based on an electrical parameter of a grid-tied point or according to a scheduling command, and may be a specific power value or a proportion value. For determining of the power parameter, refer to the embodiment described with reference to FIG. 4. Details are not described herein again.

In some feasible implementations, the inverter may determine, based on the communication transmission medium through which the power control packet is received, the target adjustment manner corresponding to the power control packet from the at least two adjustment manners. The power control packet is delivered by the controller to the inverter. The communication transmission medium may be understood as a communication line or a communication port. To be specific, different lines or ports correspond to different adjustment manners. For example, a first communication line or port (namely, a first communication transmission medium) corresponds to the first adjustment manner, and a second communication line or port (namely, a second communication transmission medium) corresponds to the second adjustment manner. In other words, if the inverter receives the power control packet through the first communication transmission medium, the inverter determines that the target adjustment manner corresponding to the power control packet is the first adjustment manner; or if the inverter receives the power control packet through the second communication transmission medium, the inverter determines that the target adjustment manner corresponding to the power control packet is the second adjustment manner. For example, a transmission speed of the first communication medium is higher than that of the second communication medium.

Optionally, in some feasible implementations, the inverter may determine, based on the received power control packet, the target adjustment manner corresponding to the power control packet from the at least two adjustment manners. The power control packet is delivered by the controller to the inverter.

For example, the inverter may determine, based on a packet format of the received power control packet, the target adjustment manner corresponding to the power control packet. Different communication modes correspond to different packet formats, and different packet formats correspond to different adjustment manners. In other words, in this embodiment of this disclosure, different communication modes correspond to different adjustment manners.

If the packet format of the power control packet received by the inverter is a first packet format, the inverter determines that the target adjustment manner corresponding to the power control packet is the first adjustment manner; or if the packet format of the power control packet received by the inverter is a second packet format, the inverter determines that the target adjustment manner corresponding to the power control packet is the second adjustment manner. For example, packet formats corresponding to communication modes such as Ethernet GOOSE communication, UDP communication, bus communication (for example, CAN, EtherCat, or Profibus), and 5G may be the first packet format, and all correspond to the first adjustment manner; and packet formats corresponding to communication modes such as Ethernet TCP, ZigBee wireless communication, 3G, or 4G are the second packet format, and all correspond to the second adjustment manner. In other words, a communication mode in which the power control packet is transmitted based on the first packet format is a fast communication mode, and a communication mode in which the power control packet is transmitted based on the second packet format is a slow communication mode. The inverter in this embodiment of this disclosure can directly identify any one of the foregoing fast communication modes.

For another example, the inverter may determine, based on a packet identifier carried in the received power control packet, the target adjustment manner corresponding to the power control packet. For example, if the power control packet received by the inverter carries a first packet identifier, the inverter determines that the target adjustment manner corresponding to the power control packet is the first adjustment manner; or if the power control packet received by the inverter carries a second packet identifier, the inverter determines that the target adjustment manner corresponding to the power control packet is the second adjustment manner.

The packet identifier may be read by the inverter from the power control packet, and may be a Boolean variable (0 or 1). For example, the first packet identifier is represented as 1, and corresponds to the first adjustment manner, and the second packet identifier is represented as 0, and corresponds to the second adjustment manner. Alternatively, the packet identifier may be a data bit, a speed value, a recognizable data value, or the like. A specific representation form of the packet identifier is not limited in this embodiment of this disclosure.

In some feasible implementations, the power control packet includes an active power control packet and/or a reactive power control packet. If the inverter receives the active power control packet, in this embodiment of this disclosure, the first adjustment manner is a first active power adjustment manner, and the second adjustment manner is a second active power adjustment manner. If the inverter obtains the reactive power control packet, in this embodiment of this disclosure, the first adjustment manner is a first reactive power adjustment manner, and the second adjustment manner is a second reactive power adjustment manner.

For example, if the inverter receives the active power control packet through the first communication transmission medium, the inverter determines that a target adjustment manner corresponding to the active power control packet is the first active power adjustment manner; or if the inverter receives the active power control packet through the second communication transmission medium, the inverter determines that a target adjustment manner corresponding to the active power control packet is the second active power adjustment manner. If the inverter receives the reactive power control packet through the first communication transmission medium, the inverter determines that a target adjustment manner corresponding to the reactive power control packet is the first reactive power adjustment manner; or if the inverter receives the reactive power control packet through the second communication transmission medium, the inverter determines that a target adjustment manner corresponding to the reactive power control packet is the second reactive power adjustment manner.

For example, if the inverter receives the active power control packet and a packet format of the active power control packet is the first packet format, the inverter determines that a target adjustment manner corresponding to the active power control packet is the first active power adjustment manner; or if a packet format of the active power control packet is the second packet format, the inverter determines that a target adjustment manner corresponding to the active power control packet is the second active power adjustment manner. If the inverter receives the reactive power control packet and a packet format of the reactive power control packet is the first packet format, the inverter determines that a target adjustment manner corresponding to the reactive power control packet is the first reactive power adjustment manner; or if a packet format of the reactive power control packet is the second packet format, the inverter determines that a target adjustment manner corresponding to the reactive power control packet is the second reactive power adjustment manner.

For another example, if the inverter receives the active power control packet and the active power control packet carries the first packet identifier, the inverter determines that a target adjustment manner corresponding to the active power control packet is the first active power adjustment manner; or if the active power control packet carries the second packet identifier, the inverter determines that a target adjustment manner corresponding to the active power control packet is the second active power adjustment manner. If the inverter receives the reactive power control packet and the reactive power control packet carries the first packet identifier, the inverter determines that a target adjustment manner corresponding to the reactive power control packet is the first reactive power adjustment manner; or if the reactive power control packet carries the second packet identifier, the inverter determines that a target adjustment manner corresponding to the reactive power control packet is the second reactive power adjustment manner.

It can be understood that the inverter may determine, by combining the foregoing several feasible implementations, the target adjustment manner corresponding to the power control packet.

For example, FIG. 6 is a schematic diagram of a process of determining an adjustment manner by an inverter according to an embodiment of this disclosure. As shown in FIG. 6, the controller may establish a communication connection to the inverter through the first communication transmission medium or the second communication transmission medium. To be specific, the power control packet may be transmitted to the inverter through the first communication transmission medium or the second communication transmission medium. The first communication transmission medium is a fast communication line, and the second communication transmission medium is a slow communication line.

When receiving the power control packet, the inverter performs step S5011a or S5011b to determine the packet format of the power control packet.

In some feasible implementations, the inverter receives the power control packet through the first communication transmission medium, and performs S5011b to determine whether the packet format of the power control packet is the second packet format. It should be noted that a communication mode in which the power control packet is transmitted based on the second packet format is usually a slow communication mode, for example, a communication mode such as Ethernet TCP, ZigBee wireless communication, 3G, or 4G.

If the packet format of the power control packet is the second packet format, the inverter may further perform step S5012 to determine whether the power control packet carries the first packet identifier, to identify a case in which a slow communication mode is used in the fast communication line. If the power control packet carries the first packet identifier, the inverter performs step S5013b to determine that the target adjustment manner corresponding to the power control packet is the first adjustment manner. In this case, if the power control packet is an active power control packet, the inverter generates a fast-active power instruction; or if the power control packet is a reactive power control packet, the inverter generates a fast-reactive power instruction. If the power control packet does not carry the first packet identifier, the inverter performs step S5013a to determine that the target adjustment manner corresponding to the power control packet is the second adjustment manner. In this case, if the power control packet is an active power control packet, the inverter generates a regular active power instruction; or if the power control packet is a reactive power control packet, the inverter generates a regular reactive power instruction.

If the packet format of the power control packet is not the second packet format (in other words, is the first packet format), the inverter performs step S5013b to determine that the target adjustment manner corresponding to the power control packet is the first adjustment manner. In this case, if the power control packet is an active power control packet, the inverter generates a fast-active power instruction; or if the power control packet is a reactive power control packet, the inverter generates a fast-reactive power instruction.

In other words, when the inverter receives the power control packet in the first packet format through the fast communication line, or receives the power control packet in the second packet format but the power control packet carries the first packet identifier, the inverter determines that the target adjustment manner corresponding to the power control packet is the first adjustment manner, and generates the fast-active power instruction or the fast-reactive power instruction.

Similarly, in some feasible implementations, the inverter receives the power control packet through the second communication transmission medium, and performs S5011a to determine whether the packet format of the power control packet is the first packet format. It should be noted that a communication mode in which the power control packet is transmitted based on the first packet format is usually a fast communication mode, for example, Ethernet GOOSE communication, UDP communication, or bus communication (for example, CAN, EtherCat, or Profibus).

If the packet format of the power control packet is the first packet format, the inverter may further perform step S5012 to determine whether the power control packet carries the first packet identifier, to be compatible with a case in which a fast communication mode is used in the slow communication line. If the power control packet carries the first packet identifier, the inverter performs step S5013b to determine that the target adjustment manner corresponding to the power control packet is the first adjustment manner. In this case, if the power control packet is an active power control packet, the inverter generates a fast-active power instruction; or if the power control packet is a reactive power control packet, the inverter generates a fast-reactive power instruction. If the power control packet does not carry the first packet identifier, the inverter performs step S5013a to determine that the target adjustment manner corresponding to the power control packet is the second adjustment manner. In this case, if the power control packet is an active power control packet, the inverter generates a regular active power instruction; or if the power control packet is a reactive power control packet, the inverter generates a regular reactive power instruction.

If the packet format of the power control packet is not the first packet format (in other words, is the second packet format), the inverter performs step S5013a to determine that the target adjustment manner corresponding to the power control packet is the second adjustment manner. In this case, if the power control packet is an active power control packet, the inverter generates a regular active power instruction; or if the power control packet is a reactive power control packet, the inverter generates a regular reactive power instruction.

In other words, when the inverter receives the power control packet in the second packet format through the slow communication line, or receives the power control packet in the first packet format but the power control packet does not carry the first packet identifier, the inverter determines that the target adjustment manner corresponding to the power control packet is the second adjustment manner, and generates the regular active power instruction or the regular reactive power instruction.

S502: The inverter adjusts, to the target power in the target adjustment manner, the power to be output by the inverter to the AC power grid.

It should be noted that adjustment response time for adjusting, by the inverter to the target power in the first adjustment manner, the power to be output by the inverter to the AC power grid is less than adjustment response time for adjusting, to the target power in the second adjustment manner, the power to be output by the inverter to the AC power grid.

In some feasible implementations, FIG. 7 is a schematic diagram of a process of implementing power adjustment by an inverter according to an embodiment of this disclosure. First, it should be noted that the power control packet includes an active power control packet and/or a reactive power control packet.

In some feasible implementations, the power parameter includes first active power, and the inverter determines the target active power based on the first active power and current maximum active output power of the inverter.

When generating the fast-active power instruction, the inverter determines that the target adjustment manner corresponding to the active power control packet is the first active power adjustment manner, determines a first active current based on the target active power and a correspondence between active power and an active current, and adjusts, to the target active power based on the first active current, the power to be output by the inverter to the AC power grid.

During specific implementation, the inverter performs step S702a shown in FIG. 7, to perform first active power adjustment. To be specific, current environment information of a power supply module coupled to the inverter is input to an optical power prediction model, where the optical power prediction model includes a correspondence between environment information and maximum active output power of the inverter, to obtain the current maximum active output power of the inverter. For example, an environment monitor is disposed in the power supply module, and the environment monitor sends the current environment information of the power supply module to the inverter.

For example, this embodiment of this disclosure may be applied to a photovoltaic scenario. In this case, the power supply module is a photovoltaic module, and current environment information of the photovoltaic module includes one or more of the following: cleanliness of the photovoltaic module, a blocking status of the photovoltaic module, temperature of the photovoltaic module, an angle of the photovoltaic module, radiation of the photovoltaic module, and the like.

For another example, this embodiment of this disclosure may be applied to a wind power scenario. In this case, the power supply module is a wind power generation apparatus, and current environment information of the wind power generation apparatus includes one or more of the following: a magnitude of wind power, a height of the wind power generation apparatus, a pollution status of the wind power generation apparatus, and the like.

For example, to prevent the target active power from being greater than active power that can be provided by each power supply module, a smaller value of the current maximum active output power of the inverter and the target active power is used as the target active power to be output by the inverter to the AC power grid. The first active current $i_{d1}$ may be obtained by inputting the target active power to a power grid situational awareness model, and the first active current $i_{d1}$ is input to a high-speed active current loop to obtain a first active voltage $U_{d1}$. A difference between the high-speed active current loop and a current loop in other technologies lies in that an integral parameter of the high-speed active current loop is larger, so that output of the first active voltage $u_{d1}$ can be accelerated. In this embodiment of this disclosure, response time for obtaining an active voltage through a fast-active power response is within 20 ms. Compared with a 100-ms active power response in other technologies, a fast-active power response can be implemented in this embodiment of this disclosure, and a response speed is high.

The power grid situational awareness model also includes a correspondence between active power and an active current. For example, the correspondence between active power and an active current may be represented as a functional expression, or may be represented as a one-to-one mapping relationship in a table. A representation form of a correspondence between power and a current is not limited in this embodiment of this disclosure.

Optionally, in some feasible implementations, the power parameter includes a reactive power parameter, and the inverter determines target reactive power based on the reactive power parameter. When generating the fast-reactive power instruction, the inverter determines that the target adjustment manner corresponding to the power control packet is the first reactive power adjustment manner, determines a first reactive current based on the target reactive power and a correspondence between reactive power and a reactive current, and adjusts, to the target reactive power based on the first reactive current, the power to be output by the inverter to the AC power grid.

During specific implementation, the inverter performs step S702b shown in FIG. 7, to perform first reactive power adjustment. To be specific, the target reactive power is input to a power grid situation awareness model to obtain a first reactive current $i_{q1}$, and the first reactive current $i_{q1}$ is input to a high-speed reactive current loop to obtain a first reactive voltage $u_{q1}$. A difference between the high-speed reactive current loop and a current loop in other technologies lies in that an integral parameter of the high-speed reactive current loop is larger, so that output of the first reactive voltage $u_{q1}$ can be accelerated. In this embodiment of this disclosure, response time for obtaining a reactive voltage through a fast-reactive power response may be within 10 ms, and a response is fast.

The power grid situational awareness model includes a correspondence between reactive power and a reactive current. For example, the correspondence between reactive power and a reactive current may be represented as a functional expression, or may be represented as a one-to-one mapping relationship in a table. A representation form of a correspondence between power and a current is not limited in this embodiment of this disclosure.

Optionally, in some feasible implementations, the power parameter includes an active power parameter, and the inverter determines target active power based on the active power parameter.

When generating the regular active power instruction, the inverter determines that the target adjustment manner corresponding to the active power control packet is the second active power adjustment manner, determines a second active current based on the target active power and reference active power, and adjusts, to the target active power based on the second active current, the power to be output by the inverter to the AC power grid.

Adjustment response time for adjusting, to the target active power in the second active power adjustment manner, the power to be output by the inverter to the AC power grid is greater than adjustment response time for adjusting, to the target active power in the first active power adjustment manner, the power to be output by the inverter to the AC power grid.

During specific implementation, the inverter performs step S702c shown in FIG. 7, to perform second active power adjustment. The preset reference active power $P_{ref}$ is obtained through power scheduling. The second active current $i_{d2}$ may be obtained by inputting a difference between the target active power and the reference active power $P_{ref}$ to an outer power loop. The second active current $i_{d2}$ is input to an active current loop to obtain a second active voltage $U_{d2}$. For specific implementations of the outer power loop and the active current loop, refer to other technologies. Details are not described herein.

Optionally, in some feasible implementations, the power parameter includes a reactive power parameter, and the inverter determines target reactive power based on the reactive power parameter.

When generating the regular reactive power instruction, the inverter determines that the target adjustment manner corresponding to the reactive power control packet is the second reactive power adjustment manner, determines a second reactive current based on the target reactive power and reference reactive power, and adjusts, to the target reactive power based on the second reactive current, the power to be output by the inverter to the AC power grid.

Adjustment response time for adjusting, to the target reactive power in the second reactive power adjustment manner, the power to be output by the inverter to the AC power grid is greater than adjustment response time for adjusting, to the target reactive power in the first reactive power adjustment manner, the power to be output by the inverter to the AC power grid.

During specific implementation, the inverter performs step S702d shown in FIG. 7, to perform second reactive power adjustment. The preset reference reactive power $Q_{ref}$ is obtained through power scheduling. The second reactive current $i_{q2}$ may be obtained by inputting a difference between the target reactive power and the reference reactive power $Q_{ref}$ to an outer power loop. The second reactive current $i_{q2}$ is input to a reactive current loop to obtain a second reactive voltage $U_{q2}$. For specific implementations of the outer power loop and the reactive current loop, refer to other technologies. Details are not described herein.

Further, the inverter may generate a modulation waveform based on the reactive voltage and/or the active voltage, to control the inverter to output the target active power and/or the target reactive power. In other words, the inverter may adjust only active power or reactive power to be output by the inverter to the AC power grid, or may adjust both active power and reactive power to be output by the inverter to the AC power grid.

For example, the inverter may select the first reactive voltage $u_{q1}$ and the first active voltage $u_{d1}$ as dq-axis voltages, convert the dq-axis voltages into abc three-phase voltages, and generate a first modulation waveform based on the abc three-phase voltages. The first modulation waveform is represented as three pulse-width modulation (PWM) waves, and duty cycles corresponding to the three PWM waves are $D_a$, $D_b$, and $D_c$. For a specific method for generating a modulation waveform based on a voltage, refer to other technologies. Details are not described herein.

It should be noted that the inverter includes a control module and a circuit topology. The foregoing method steps performed by the inverter are all performed by the control module in the inverter, and the finally generated modulation waveform is output to the circuit topology in the inverter, to control on duration of each switching transistor in the circuit topology of the inverter to adjust the power to be output by the inverter to the AC power grid.

In some feasible implementations, switching may be performed between step S702b and step S702d. For example, when the voltage at the grid-tied point drops, the inverter performs step S702b to adjust, to the target reactive power in the first active power adjustment manner, the power to be output by the inverter to the AC power grid. After the voltage at the grid-tied point recovers, the inverter may switch to step S702d to output the target reactive power to the AC power grid at a response speed in the second active power adjustment manner. It can be understood that the first active power adjustment enables the grid-tied power supply system provided in this embodiment of this disclosure to meet a requirement for response time in the technical specification, and the second active power adjustment is more conducive to maintaining stability of the AC power grid. Therefore, during implementation of this embodiment of this disclosure, a requirement for a reactive power compensation speed for the AC power grid can be met, and stability of the AC power grid can also be maintained.

In embodiments of this disclosure, the inverter may identify, based on the received power control packet, the target adjustment manner corresponding to the power control packet. When the target adjustment manner is the first reactive power adjustment manner, the inverter can implement both a fast-reactive power response and a fast-active power response, so that the technical specification can still be met without using an SVG device. During implementation of embodiments of this disclosure, costs can be reduced, and power consumption during system operation can be reduced, to implement frequency modulation within short time.

Figure 8:
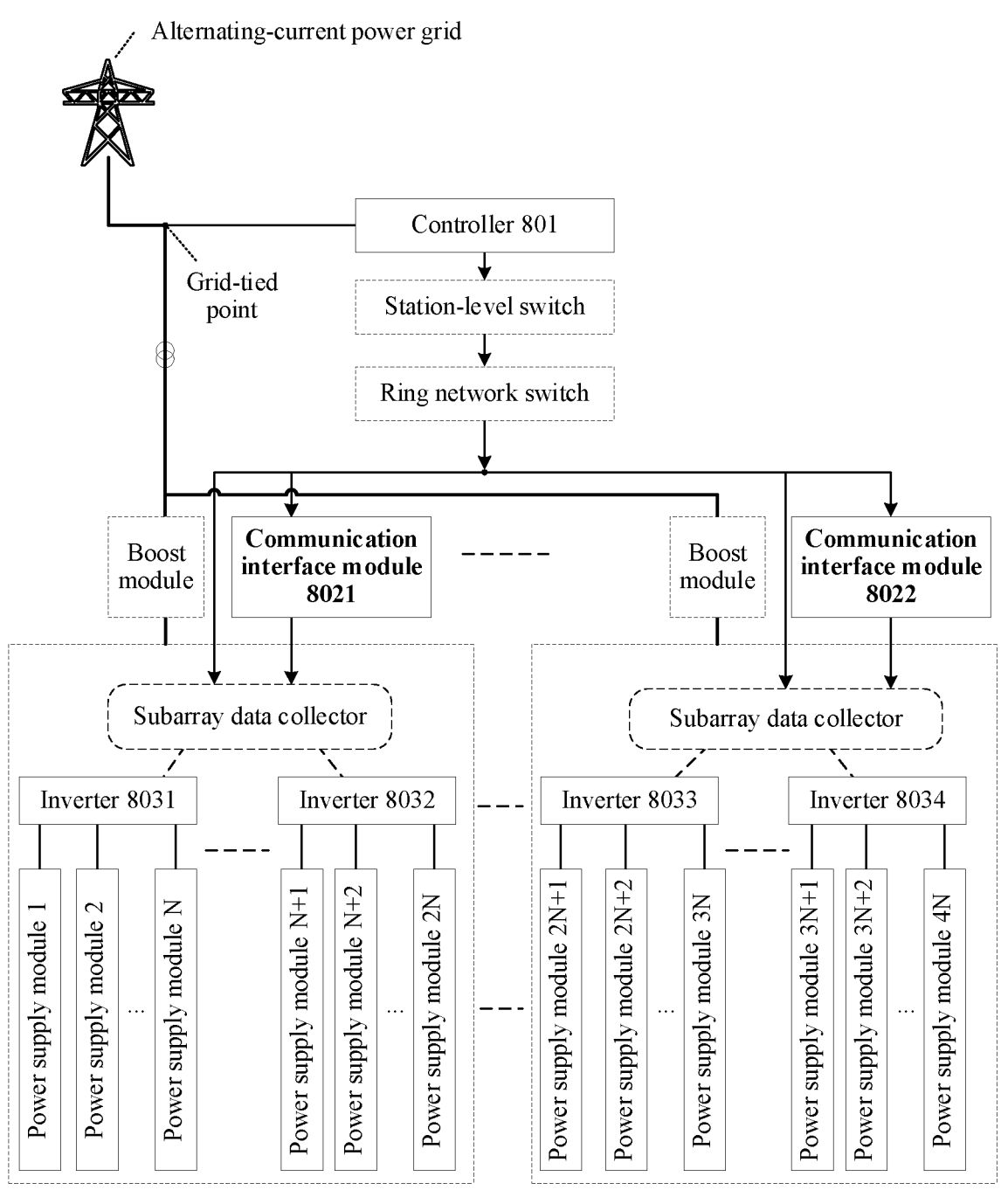
FIG. 8 is a block diagram of another partial structure of a grid-tied power supply system according to an embodiment of this disclosure.

FIG. 8 is a block diagram of another structure of a grid-tied power supply system according to an embodiment of this disclosure. As shown in FIG. 8, the grid-tied power supply system includes a controller 801 and at least two inverters, for example, an inverter 8031, an inverter 8032, an inverter 8033, and an inverter 8034, and the grid-tied power supply system further includes a communication interface module.

In this embodiment of this disclosure, the communication interface module is added to the grid-tied power supply system shown in FIG. 4. For a station-level switch, a ring network switch, a boost module, and the like in the grid-tied power supply system, refer to the embodiment described with reference to FIG. 2. Details are not described herein again.

The communication interface module in this embodiment of this disclosure may establish a communication connection to the controller 801, or may establish a communication connection to the inverter. For example, the communication interface module may be represented as a subarray data collector, a subarray controller, a subarray all-in-one box-type transformer measurement and control apparatus, a communication management apparatus, or a protocol conversion apparatus. Optionally, the communication interface module may be placed near the boost module or the inverter, to provide a communication interface for at least one inverter.

In FIG. 8, an example in which one communication interface module is correspondingly disposed for one photovoltaic subarray is used. For example, a communication interface module 8021 is correspondingly disposed for a subarray to which the inverter 8031 and the inverter 8032 belong, and a communication interface module 8022 is correspondingly disposed for a subarray to which the inverter 8033 and the inverter 8034 belong.

In some feasible implementations, the communication interface module 8021 receives a first power control packet delivered by the controller 801, converts the first power control packet into a second power control packet, and sends the second power control packet to the inverter 8031 and the inverter 8032 through the subarray data collector. Packet formats of the first power control packet and the second power control packet are different, but both the first power control packet and the second power control packet carry a same power parameter. Similarly, the communication interface module 8022 receives a first power control packet delivered by the controller 801, converts the first power control packet into a second power control packet, and sends the second power control packet to the inverter 8033 and the inverter 8034 through a subarray data collector.

Optionally, in some feasible implementations, each inverter such as the inverter 8031, the inverter 8032, the inverter 8033, or the inverter 8034 may alternatively directly receive, through a subarray data collector, a first power control packet delivered by the controller.

A packet format of the first power control packet varies in different communication modes. Currently, most inverters in use support only a packet format in a slow communication mode, for example, a communication mode such as Ethernet TCP, ZigBee wireless communication, 3G, or 4G. To change a packet format supported by an inverter, a physical layer of the inverter needs to be changed, that is, an inverter in use needs to be replaced. To be compatible with an inverter in use for fast communication, in this embodiment of this disclosure, the communication interface module is added for converting a packet format. For example, a packet format of the first power control packet delivered by the controller 801 is a packet format corresponding to a fast communication mode, for example, a communication mode such as Ethernet GOOSE communication, UDP communication, or bus communication (for example, CAN, EtherCat, and Profibus). The communication interface module converts the first power control packet into the second power control packet. In this case, a packet format corresponding to the second power control packet is a packet format that can be supported by each inverter such as the inverter 8031, the inverter 8032, the inverter 8033, and the inverter 8034, for example, a packet format corresponding to the slow communication mode.

It can be understood that, in FIG. 8, an example in which one communication interface module is correspondingly disposed for one photovoltaic array is used for description. In some feasible implementations, in the grid-tied power supply system, communication interface modules may be correspondingly disposed for some photovoltaic arrays, and no communication interface module is disposed for other photovoltaic arrays. For example, the communication interface module 8021 is correspondingly disposed for the inverter 8031 and the inverter 8032, but the communication interface module 8022 may not be disposed for the inverter 8033 or the inverter 8034. In this case, the inverter 8033 and the inverter 8034 may perform the embodiments described with reference to FIG. 5 to FIG. 7.

The inverter receives the second power control packet from the communication interface module, and determines that a target adjustment manner corresponding to the second power control packet is a first adjustment manner. If the second power control packet is an active power control packet, the inverter generates a fast-active power instruction. If the second power control packet is a reactive power control packet, the inverter generates a fast-reactive power instruction. For example, the inverter 8031 and the inverter 8032 receive the second power control packet sent by the communication interface module 8021, and the inverter 8033 and the inverter 8034 receive the second power control packet sent by the communication interface module 8022.

After receiving the first power control packet from the controller 801, the inverter determines that a target adjustment manner corresponding to the first power control packet is a second adjustment manner. If the first power control packet is an active power control packet, the inverter generates a regular active power instruction. If the first power control packet is a reactive power control packet, the inverter generates a regular reactive power instruction.

For how to generate an active current or a reactive current according to an instruction (for example, the fast-active power instruction, the fast-reactive power instruction, the regular active power instruction, or the regular reactive power instruction) after the inverter generates the instruction to adjust power to be output by the inverter to an AC power grid, refer to the embodiment described with reference to FIG. 7. Details are not described herein again.

In this embodiment of this disclosure, the communication interface module is added to the grid-tied power supply system. The communication interface module may perform packet format conversion on the first power control packet delivered by the controller, to convert the first power control packet into the second power control packet that can be identified by the inverter. Provided that the inverter receives the second power control packet from the communication interface module, the inverter can determine that the target adjustment manner corresponding to the second power control packet is the first adjustment manner, and perform quick response. During implementation of this embodiment of this disclosure, compatibility of the grid-tied power supply system can be improved, and applicability is high.

Figure 9:
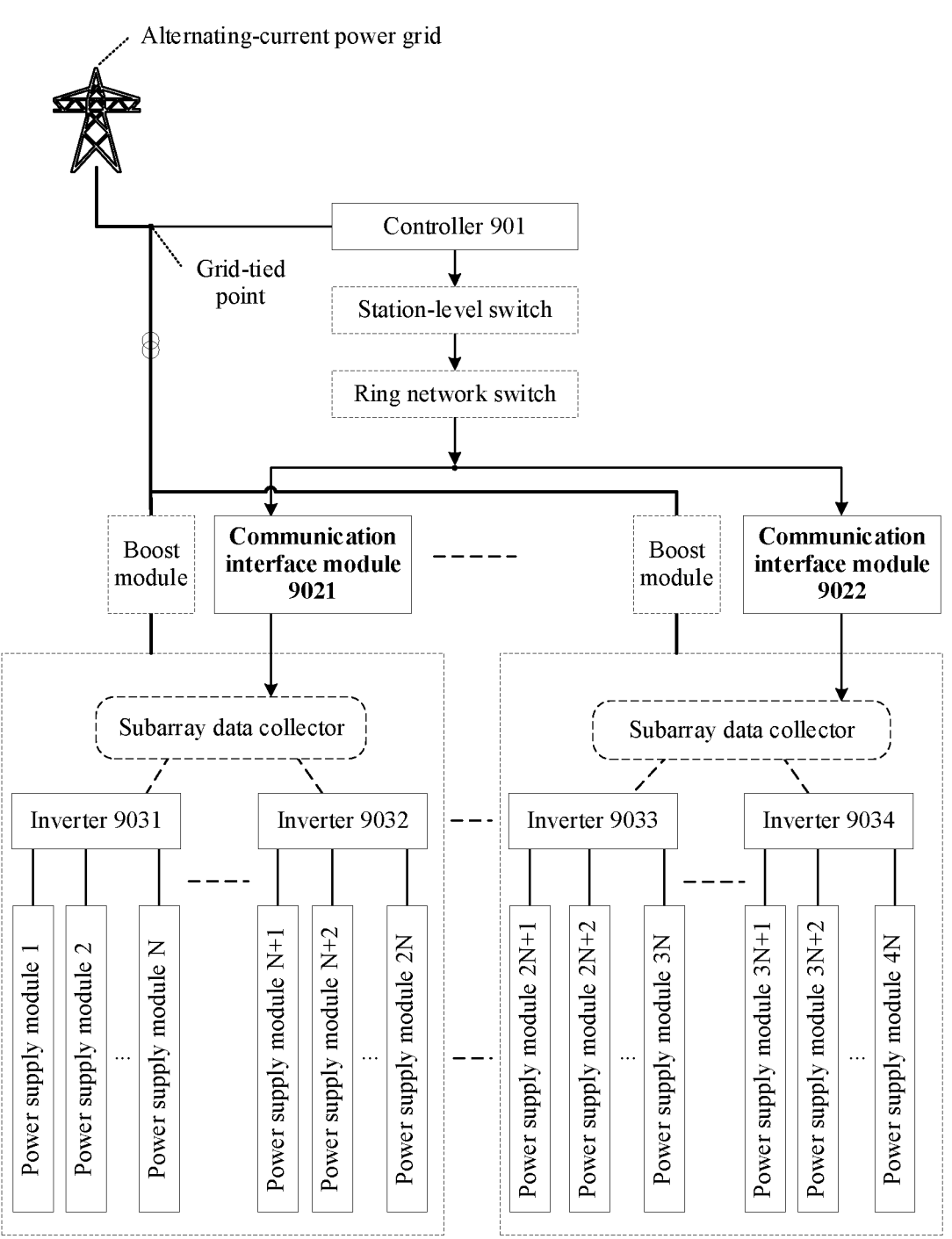
FIG. 9 is a block diagram of another partial structure of a grid-tied power supply system according to an embodiment of this disclosure.

FIG. 9 is a block diagram of another structure of a grid-tied power supply system according to an embodiment of this disclosure. As shown in FIG. 9, the grid-tied power supply system includes a controller 901 and at least two inverters, for example, an inverter 9031, an inverter 9032, an inverter 9033, and an inverter 9034, and the grid-tied power supply system further includes a communication interface module.

Figure 1:
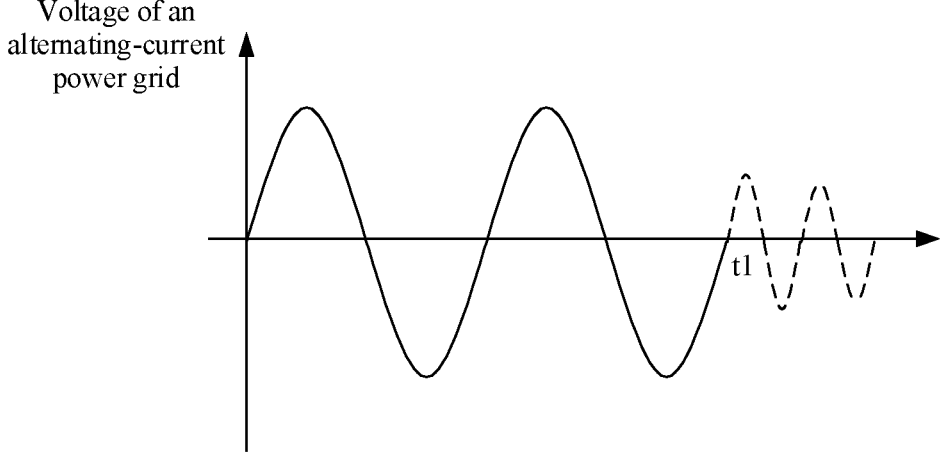
FIG. 1 is a schematic diagram of a voltage waveform of a voltage of an AC power grid.
Figure 2:
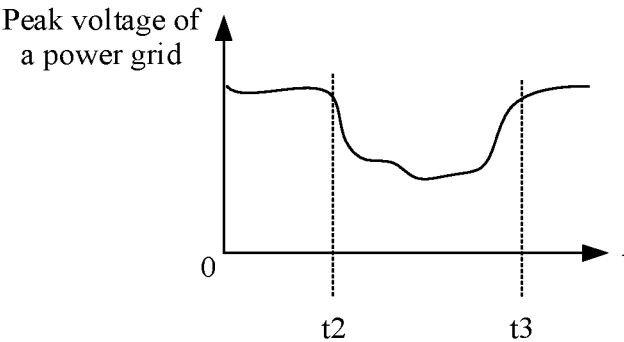
FIG. 2 is a schematic diagram of another voltage waveform of a voltage of an AC power grid.
Figure 3:
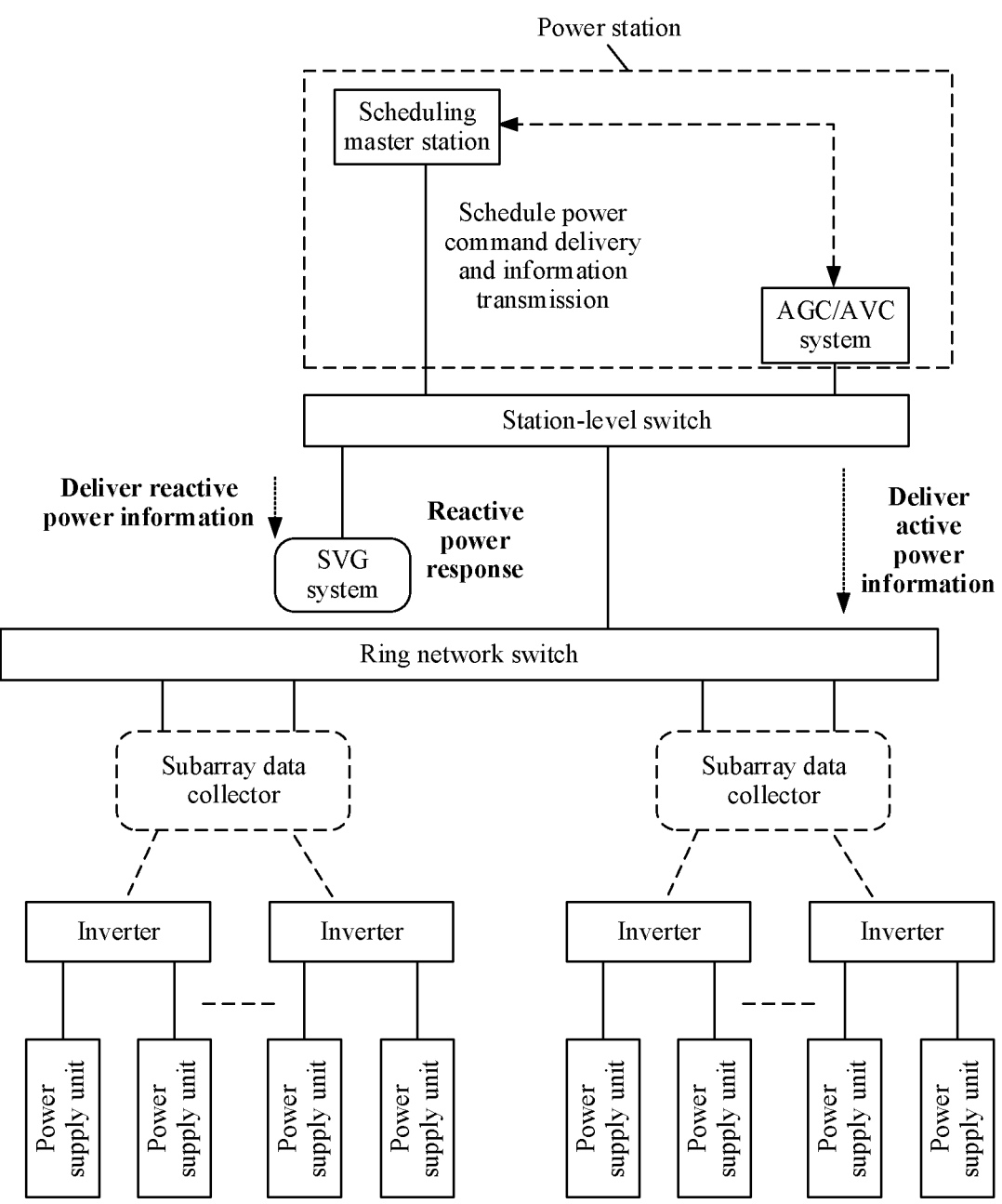
FIG. 3 is a block diagram of a structure of a power supply system in other technologies.

In this embodiment of this disclosure, the communication interface module is added to the grid-tied power supply system shown in FIG. 2. For a station-level switch, a ring network switch, a boost module, and the like in the grid-tied power supply system, refer to the embodiment described with reference to FIG. 4. Details are not described herein again.

A difference between this embodiment of this disclosure and the embodiment described in FIG. 8 lies in that, in this embodiment of this disclosure, each inverter provided with a communication interface module receives, through the communication interface module corresponding to the inverter, a power control packet delivered by the controller 901, and the inverter does not have a power control packet delivered by the controller 901.

In FIG. 9, an example in which one communication interface module is correspondingly disposed for one photovoltaic subarray is used. For example, a communication interface module 9021 is correspondingly disposed for a subarray to which the inverter 9031 and the inverter 9032 belong, and a communication interface module 9022 is correspondingly disposed for a subarray to which the inverter 9033 and the inverter 9034 belong.

Any communication interface module in the grid-tied power supply system (referred to as a communication interface module in this embodiment of this disclosure for ease of description) receives, through a communication transmission medium, a first power control packet delivered by the controller 901, and determines, based on the first power control packet and/or the communication transmission medium, a target adjustment manner corresponding to the first power control packet from at least two adjustment manners.

In some feasible implementations, the communication interface module determines, based on the communication transmission medium through which the first power control packet is received, the target adjustment manner corresponding to the first power control packet from the at least two adjustment manners. The first power control packet is delivered by the controller 901 to the communication interface module. The communication transmission medium may be understood as a communication line or a communication port. To be specific, different lines or ports correspond to different adjustment manners. For example, a third communication line or port (namely, a third communication transmission medium) corresponds to a first adjustment manner, and a fourth communication line or port (namely, a fourth communication transmission medium) corresponds to a second adjustment manner. In other words, if the communication interface module receives the first power control packet through the third communication transmission medium, the communication interface module is configured to determine that the target adjustment manner corresponding to the first power control packet is the first adjustment manner; or if the communication interface module receives the first power control packet through the fourth communication transmission medium, the communication interface module is configured to determine that the target adjustment manner corresponding to the first power control packet is the second adjustment manner.

The communication interface module generates a first adjustment identifier when the target adjustment manner corresponding to the first power control packet is the first adjustment manner. The communication interface module converts the first power control packet into a second power control packet, where the second power control packet carries the first adjustment identifier, and the first adjustment identifier indicates that the second power control packet is the first adjustment manner.

Optionally, in some feasible implementations, the communication interface module may determine, based on the received first power control packet, the target adjustment manner corresponding to the first power control packet from the at least two adjustment manners. The first power control packet is delivered by the controller 901 to the communication interface module.

For example, the communication interface module may determine, based on a packet format of the received first power control packet, the target adjustment manner corresponding to the first power control packet.

If the communication interface module receives the first power control packet and the packet format of the first power control packet is a first packet format, the communication interface module determines that the target adjustment manner corresponding to the first power control packet is the first adjustment manner; or if the packet format of the first power control packet is a second packet format, the communication interface module determines that the target adjustment manner corresponding to the first power control packet is the second adjustment manner. For example, packet formats corresponding to communication modes such as Ethernet GOOSE communication, UDP communication, bus communication (for example, CAN, EtherCat, or Profibus), and 5G are the first packet format, and all correspond to the first adjustment manner; and packet formats corresponding to communication modes such as Ethernet TCP, ZigBee wireless communication, 3G, or 4G are the second packet format, and all correspond to the second adjustment manner. In other words, a communication mode in which the power control packet is transmitted based on the first packet format is a fast communication mode, and a communication mode in which the power control packet is transmitted based on the second packet format is a slow communication mode. The communication interface module in this embodiment of this disclosure can identify any one of the foregoing fast communication modes.

For another example, the communication interface module may determine, based on a packet identifier carried in the first power control packet, the target adjustment manner corresponding to the first power control packet. For example, if the first power control packet received by the communication interface module carries a first packet identifier, the communication interface module determines that the target adjustment manner corresponding to the first power control packet is the first adjustment manner; or if the first power control packet received by the communication interface module carries a second packet identifier, the communication interface module determines that the target adjustment manner corresponding to the first power control packet is the second adjustment manner. The packet identifier may be read by the communication interface module from the power control packet, and may be a Boolean variable (0 or 1). For example, the first packet identifier is represented as 1, and corresponds to the first adjustment manner, and the second packet identifier is represented as 0, and corresponds to the second adjustment manner. Alternatively, the packet identifier may be a data bit, a speed value, a recognizable data value, or the like. A specific representation form of the packet identifier is not limited in this embodiment of this disclosure.

In some feasible implementations, the first power control packet includes a first active power control packet and/or a first reactive power control packet. If the communication interface module receives the first active power control packet, in this embodiment of this disclosure, the first adjustment manner is a first active power adjustment manner, and the second adjustment manner is a second active power adjustment manner. If the communication interface module receives the first reactive power control packet, in this embodiment of this disclosure, the first adjustment manner is a first reactive power adjustment manner, and the second adjustment manner is a second reactive power adjustment manner.

For example, if the communication interface module receives the first active power control packet through the third communication transmission medium, the communication interface module determines that a target adjustment manner corresponding to the first active power control packet is the first active power adjustment manner; or if the communication interface module receives the first active power control packet through the fourth communication transmission medium, the communication interface module determines that a target adjustment manner corresponding to the first active power control packet is the second active power adjustment manner. If the communication interface module receives the first reactive power control packet through the third communication transmission medium, the communication interface module determines that a target adjustment manner corresponding to the first reactive power control packet is the first reactive power adjustment manner; or if the communication interface module receives the first reactive power control packet through the fourth communication transmission medium, the communication interface module determines that a target adjustment manner corresponding to the first reactive power control packet is the second reactive power adjustment manner.

For example, if the communication interface module receives the first active power control packet and a packet format of the first active power control packet is the first packet format, the communication interface module determines that a target adjustment manner corresponding to the first active power control packet is the first active power adjustment manner; or if a packet format of the first active power control packet is the second packet format, the communication interface module determines that a target adjustment manner corresponding to the first active power control packet is the second active power adjustment manner. If the communication interface module receives the first reactive power control packet and a packet format of the first reactive power control packet is the first packet format, the communication interface module determines that a target adjustment manner corresponding to the first reactive power control packet is the first reactive power adjustment manner; or if a packet format of the first reactive power control packet is the second packet format, the communication interface module determines that a target adjustment manner corresponding to the first reactive power control packet is the second reactive power adjustment manner.

For another example, if the communication interface module receives the first active power control packet and the first active power control packet carries the first packet identifier, the communication interface module determines that a target adjustment manner corresponding to the first active power control packet is the first active power adjustment manner; or if the first active power control packet carries the second packet identifier, the communication interface module determines that a target adjustment manner corresponding to the first active power control packet is the second active power adjustment manner. If the communication interface module receives the first reactive power control packet and the first reactive power control packet carries the first packet identifier, the communication interface module determines that a target adjustment manner corresponding to the first reactive power control packet is the first reactive power adjustment manner; or if the first reactive power control packet carries the second packet identifier, the communication interface module determines that a target adjustment manner corresponding to the first reactive power control packet is the second reactive power adjustment manner.

It can be understood that the communication interface module may determine, by combining the foregoing several feasible implementations, the target adjustment manner corresponding to the first power control packet.

Figure 10:
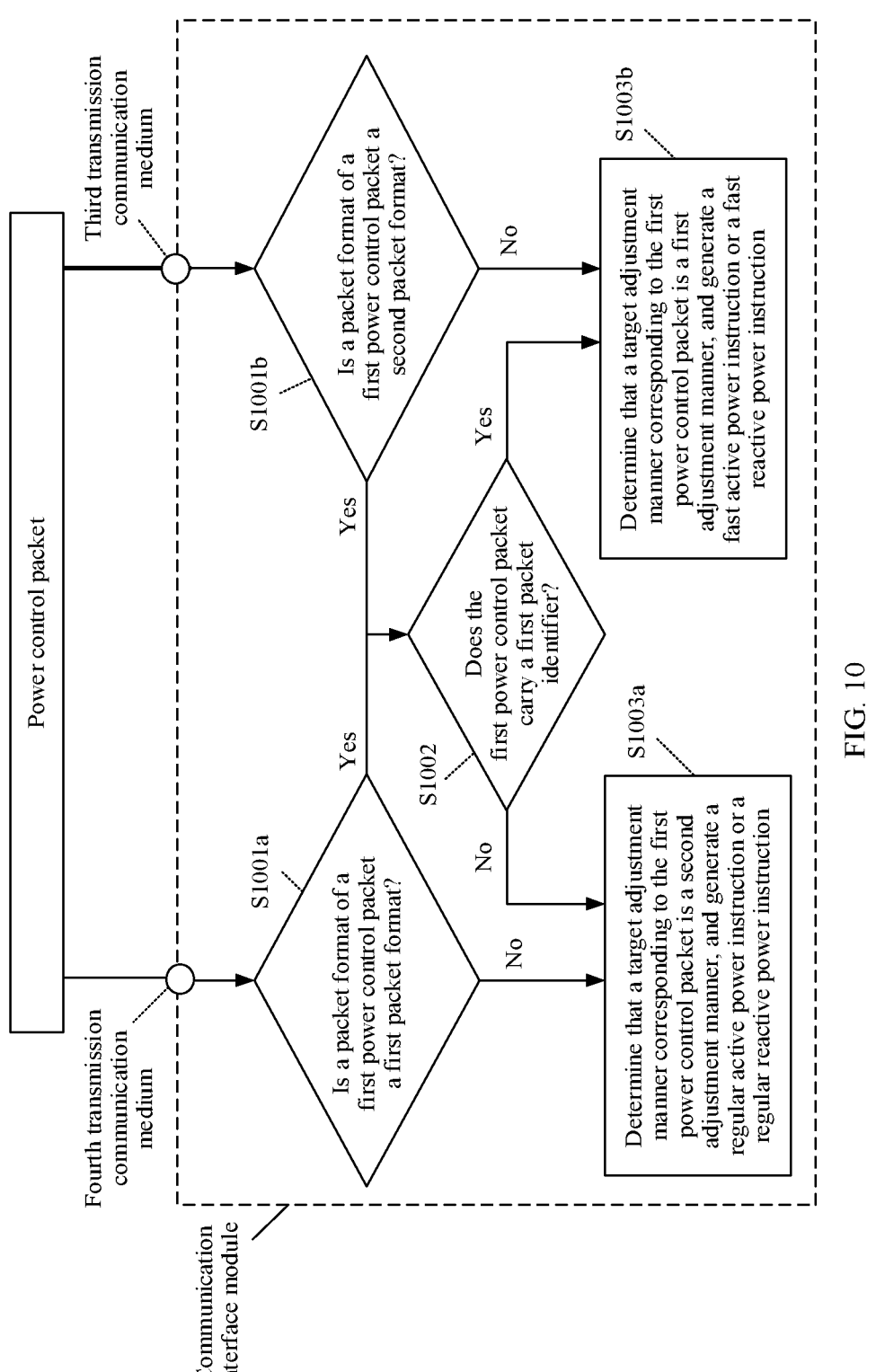
FIG. 10 is a schematic diagram of a process of determining an adjustment manner by a communication interface module according to an embodiment of this disclosure.

For example, FIG. 10 is a schematic diagram of a process of determining an adjustment manner by a communication interface module according to an embodiment of this disclosure. As shown in FIG. 10, the controller may establish a connection to the communication interface module through the third communication transmission medium or the fourth communication transmission medium. To be specific, the first power control packet may be transmitted to the communication interface module through the third communication transmission medium or the fourth communication transmission medium. The third communication transmission medium is a fast communication line, and the fourth communication transmission medium is a slow communication line.

When receiving the first power control packet, the communication interface module performs step S1001*a* or S1001*b* to determine the packet format of the first power control packet.

In some feasible implementations, the communication interface module receives the first power control packet through the third communication transmission medium, and performs S1001*b* to determine whether the packet format of the first power control packet is the second packet format. It should be noted that a communication mode in which the first power control packet is transmitted based on the second packet format is usually a slow communication mode, for example, a communication mode such as Ethernet TCP, ZigBee wireless communication, 3G, or 4G.

If the packet format of the first power control packet is the second packet format, the communication interface module may further perform step S1002 to determine whether the first power control packet carries the first packet identifier, to identify a case in which a slow communication mode is used in the fast communication line. If the first power control packet carries the first packet identifier, the communication interface module performs step S1003*b* to determine that the target adjustment manner corresponding to the first power control packet is the first adjustment manner, and generate the first adjustment identifier. In this case, if the first power control packet is the first active power control packet, the communication interface module generates a first active power adjustment identifier; or if the first power control packet is the first reactive power control packet, the communication interface module generates a first reactive power adjustment identifier. If the first power control packet does not carry the first packet identifier, the communication interface module performs step S1003*a* to determine that the target adjustment manner corresponding to the first power control packet is the second adjustment manner, and generate a second adjustment identifier. In this case, if the first power control packet is the first active power control packet, the communication interface module generates a second active power adjustment identifier; or if the first power control packet is the first reactive power control packet, the communication interface module generates a second reactive power adjustment identifier.

If the packet format of the first power control packet is not the second packet format (in other words, is the first packet format), the communication interface module performs step S1003*b* to determine that the target adjustment manner corresponding to the first power control packet is the first adjustment manner, and generate the first adjustment identifier. In this case, if the first power control packet is the first active power control packet, the communication interface module generates a first active power adjustment identifier; or if the first power control packet is the first reactive power control packet, the communication interface module generates a first reactive power adjustment identifier.

In other words, when the communication interface module receives the first power control packet in the first packet format through the fast communication line, or receives the first power control packet in the second packet format but the first power control packet carries the first packet identifier, the communication interface module determines that the target adjustment manner corresponding to the first power control packet is the first adjustment manner, and generates the first adjustment identifier. It can be understood that the first adjustment identifier includes the first active power adjustment identifier and/or the first reactive power adjustment identifier.

Similarly, in some feasible implementations, the communication interface module receives the first power control packet through the fourth communication transmission medium, and performs S1001*a* to determine whether the packet format of the first power control packet is the first packet format. It should be noted that a communication mode in which the first power control packet is transmitted based on the first packet format is usually a fast communication mode, for example, Ethernet GOOSE communication, UDP communication, or bus communication (for example, CAN, EtherCat, or Profibus).

If the packet format of the first power control packet is the first packet format, the communication interface module may further perform S1002 to determine whether the first power control packet carries the first packet identifier, to be compatible with a case in which a fast communication mode is used in the slow communication line. If the first power control packet carries the first packet identifier, the communication interface module performs step S1003*b* to determine that the target adjustment manner corresponding to the first power control packet is the first adjustment manner, and generate the first adjustment identifier. In this case, if the first power control packet is the first active power control packet, the communication interface module generates a first active power adjustment identifier; or if the first power control packet is the first reactive power control packet, the communication interface module generates a first reactive power adjustment identifier. If the first power control packet does not carry the first packet identifier, the communication interface module performs step S1003*a* to determine that the target adjustment manner corresponding to the first power control packet is the second adjustment manner, and generate a second adjustment identifier. In this case, if the first power control packet is the first active power control packet, the communication interface module generates a second active power adjustment identifier; or if the first power control packet is the first reactive power control packet, the communication interface module generates a second reactive power adjustment identifier.

If the packet format of the first power control packet is not the first packet format (in other words, is the second packet format), the communication interface module performs step S1003*a* to determine that the target adjustment manner corresponding to the first power control packet is the second adjustment manner, and generate a second adjustment identifier. In this case, if the first power control packet is the first active power control packet, the communication interface module generates a second active power adjustment identifier; or if the first power control packet is the first reactive power control packet, the communication interface module generates a second reactive power adjustment identifier.

In other words, when the communication interface module receives the first power control packet in the second packet format through the slow communication line, or receives the first power control packet in the first packet format but the first power control packet does not carry the first packet identifier, the communication interface module determines that the target adjustment manner corresponding to the first power control packet is the second adjustment manner, and generates the second adjustment identifier. It can be understood that, the second adjustment identifier includes the second active power adjustment identifier and/or the second reactive power adjustment identifier.

The communication interface module sends a second power control packet carrying the first adjustment identifier or the second adjustment identifier to the inverter, where the adjustment identifier is used to determine a target adjustment manner corresponding to the second power control packet.

The inverter receives the second power control packet sent by the communication interface module, where the second power control packet includes a second active power control packet and/or a second reactive power control packet.

If the inverter receives the second active power control packet and the second active power control packet carries the first active power adjustment identifier, the inverter determines that a target adjustment manner corresponding to the second active power control packet is the first active power adjustment manner, and performs step S702$a$ shown in FIG. 7 to perform first active power adjustment. Details are not described herein again.

If the inverter receives the second active power control packet and the second active power control packet carries the second active power adjustment identifier, the inverter determines that a target adjustment manner corresponding to the second active power control packet is the second active power adjustment manner, and performs step S702$c$ shown in FIG. 7 to perform first active power adjustment. Details are not described herein again.

If the inverter receives the second reactive power control packet and the second reactive power control packet carries the first reactive power adjustment identifier, the inverter determines that a target adjustment manner corresponding to the second reactive power control packet is the first reactive power adjustment manner, and performs step S702$b$ shown in FIG. 7 to perform first reactive power adjustment. Details are not described herein again.

If the inverter receives the second reactive power control packet and the second reactive power control packet carries the second reactive power adjustment identifier, the inverter determines that a target adjustment manner corresponding to the second reactive power control packet is the second reactive power adjustment manner, and performs step S702$d$ shown in FIG. 7 to perform first reactive power adjustment. Details are not described herein again.

In this embodiment of this disclosure, the communication interface module is added to the grid-tied power supply system. The communication interface module may perform packet format conversion on the first power control packet delivered by the controller, to convert the first power control packet into the second power control packet that can be identified by the inverter; and may further identify the target adjustment manner corresponding to the first power control packet delivered by the controller, generate an adjustment identifier, and send the second power control packet carrying the adjustment identifier to the inverter, so that the inverter can perform power adjustment in differentiated manners. During implementation of this embodiment of this disclosure, compatibility of the grid-tied power supply system can be improved, and applicability is high.

It should be noted that the terms "first" and "second" are merely intended for a purpose of description, and shall not be understood as an indication or implication of relative importance.

A person of ordinary skill in the art can understand that all or some of the steps of the method embodiments may be implemented by a program instructing related hardware. The program may be stored in a computer-readable storage medium. When the program is executed, the steps of the method embodiments are performed. The storage medium includes any medium that can store program code, such as a removable storage device, a read-only memory (ROM), a random-access memory (RAM), a magnetic disk, or an optical disc.

Alternatively, when the foregoing integrated unit in the present disclosure is implemented in a form of a software functional unit and sold or used as an independent product, the integrated unit may be stored in a computer-readable storage medium. Based on such an understanding, technical solutions in embodiments of the present disclosure essentially, or a part contributing to other technologies may be implemented in a form of a software product. The computer software product is stored in a storage medium, and includes several instructions for instructing a computer device (which may be a personal computer, a server, a network device, or the like) to perform all or some of the steps of the methods in embodiments of the present disclosure. The storage medium includes any medium that can store program code, such as a removable storage device, a ROM, a RAM, a magnetic disk, or a compact disc.

What is claimed is:

1. A system, comprising:

a controller configured to determine, based on a received scheduling command or an electrical parameter of a grid-tied point, a power parameter; and an inverter configured to:

couple to a plurality of power supply modules;

convert a direct current (DC) from the plurality of power supply modules into an alternating current (AC);

transmit, through the grid-tied point, the AC to an AC power grid;

receive, through a communication transmission medium, a power control packet, wherein the power control packet comprises the power parameter;

determine, based on the power parameter, a target power, wherein the target power comprises a target active power or a target reactive power;

determine, based on the power control packet or the communication transmission medium and from at least four adjustment manners, a target adjustment manner corresponding to the power control packet, wherein the at least four adjustment manners comprise a first active power adjustment manner and a second active power adjustment manner that correspond to the target active power and comprise a first reactive power adjustment manner and a second reactive power adjustment manner that correspond to the target reactive power; and adjust, to the target active power or the target reactive power in the target adjustment manner, a power to be output by the inverter to the AC power grid, wherein a first adjustment response time for adjusting, to the target active power in the first active power adjustment manner, the power is less than a second adjustment response time for adjusting, to the target active power in the second active power adjustment manner, the power, and wherein a third adjustment response time for adjusting, to the target reactive power in the first reactive power adjustment manner, the power is less than a fourth adjustment response time for adjusting, to the target reactive power in the second reactive power adjustment manner, the power.

2. The system of claim 1, wherein the communication transmission medium comprises a first communication transmission medium or a second communication transmission medium, wherein the controller is further configured to deliver, to the inverter, the power control packet, wherein the power control packet comprises an active power control packet or a reactive power control packet, and wherein the inverter is further configured to:

determine that the target adjustment manner is the first active power adjustment manner when the inverter receives the active power control packet through the first communication transmission medium;

determine that the target adjustment manner is the second active power adjustment manner when the inverter receives the active power control packet through the second communication transmission medium;

determine that the target adjustment manner is the first reactive power adjustment manner when the inverter receives the reactive power control packet through the first communication transmission medium; and determine that the target adjustment manner is the second reactive power adjustment manner when the inverter receives the reactive power control packet through the second communication transmission medium.

3. The system of claim 1, wherein the controller is further configured to deliver, to the inverter, the power control packet, wherein the power control packet comprises an active power control packet or a reactive power control packet, and wherein the inverter is further configured to:

determine that the target adjustment manner is the first active power adjustment manner when the inverter receives the active power control packet and the active power control packet has a first packet format;

determine that the target adjustment manner is the second active power adjustment manner when the inverter receives the active power control packet and the active power control packet has a second packet format;

determine that the target adjustment manner is the first reactive power adjustment manner when the inverter receives the reactive power control packet and the reactive power control packet has the first packet format; and determine that the target adjustment manner is the second reactive power adjustment manner when the inverter receives the reactive power control packet and the reactive power control packet has the second packet format.

4. The system of claim 1, wherein the controller is further configured to deliver, to the inverter, the power control packet, wherein the power control packet comprises an active power control packet or a reactive power control packet, and wherein the inverter is further configured to:

determine that the target adjustment manner is the first active power adjustment manner when the inverter receives the active power control packet and the active power control packet carries a first packet identifier;

determine that the target adjustment manner is the second active power adjustment manner when the inverter receives the active power control packet and the active power control packet carries a second packet identifier;

determine that the target adjustment manner is the first reactive power adjustment manner when the inverter receives the reactive power control packet and the reactive power control packet carries the first packet identifier; and determine that the target adjustment manner is the second reactive power adjustment manner when the inverter receives the reactive power control packet and the reactive power control packet carries the second packet identifier.

5. The system of claim 1, wherein when the target adjustment manner is the first active power adjustment manner, the inverter is further configured to:

determine, based on the target active power and a correspondence between an active power and an active current, a first active current; and adjust, to the target active power and based on the first active current, the power.

6. The system of claim 1, wherein the power parameter comprises first active power, and wherein the inverter is further configured to:

determine, based on current environment information of the power supply modules and a correspondence between a maximum active output power and environment information, a current maximum active output power; and determine, based on the first active power and the current maximum active output power, the target active power.

7. The system of claim 1, wherein when the target adjustment manner is the first reactive power adjustment manner, the inverter is further configured to:

determine, based on the target reactive power and a correspondence between reactive power and a reactive current, a first reactive current; and adjust, to the target reactive power and based on the first reactive current, the power.

8. The system of claim 1, wherein when the target adjustment manner is the second active power adjustment manner, the inverter is further configured to:

determine, based on the target active power and a reference active power, a second active current; and adjust, to the target active power and based on the second active current, the power.

9. The system of claim 1, wherein when the target adjustment manner is the second reactive power adjustment manner, the inverter is further configured to:

determine, based on the target reactive power and a reference reactive power, a second reactive current; and adjust, to the target reactive power and based on the second reactive current, the power.

10. The system of claim 1, wherein the power control packet is a second power control packet, and wherein the system further comprises a communication interface module configured to:

receive, from the controller, a first power control packet;

convert the first power control packet into the second power control packet, wherein a first packet format of the first power control packet is different from a second packet format of the second power control packet; and send, to the inverter, the second power control packet.

11. The system of claim 10, wherein the second power control packet comprises a second active power control packet or a second reactive power control packet, and wherein the inverter is further configured to:

determine that the target adjustment manner is the first active power adjustment manner when the inverter receives the second active power control packet from the communication interface module; and determine that the target adjustment manner is the second reactive power adjustment manner when the inverter receives the second reactive power control packet from the communication interface module.

12. The system of claim 10, wherein the communication interface module is further configured to:

receive, through the communication transmission medium, the first power control packet;

determine, based on the first power control packet or the communication transmission medium, the target adjustment manner;

generate an adjustment identifier for determining the target adjustment manner; and send, to the inverter, the second power control packet carrying the adjustment identifier.

13. The system of claim 12, wherein the first power control packet comprises a first active power control packet or a first reactive power control packet, and wherein the communication interface module is further configured to:

determine that the target adjustment manner is the first active power adjustment manner when the communication interface module receives the first active power control packet through a third communication transmission medium;

determine that the target adjustment manner is the second active power adjustment manner when the communication interface module receives the first active power control packet through a fourth communication transmission medium;

determine that the target adjustment manner is the first reactive power adjustment manner when the communication interface module receives the first reactive power control packet through the third communication transmission medium; and determine that the target adjustment manner is the second reactive power adjustment manner when the communication interface module receives the first reactive power control packet through the fourth communication transmission medium.

14. The system of claim 12, wherein the first power control packet comprises a first active power control packet or a first reactive power control packet, and wherein the communication interface module is further configured to:

determine that the target adjustment manner is the first active power adjustment manner when the communication interface module receives the first active power control packet and the first active power control packet has the first packet format;

determine that the target adjustment manner is the second active power adjustment manner when the communication interface module receives the first active power control packet and the first active power control packet has the second packet format;

determine that the target adjustment manner is the first reactive power adjustment manner when the communication interface module receives the first reactive power control packet and the first reactive power control packet has the first packet format; and determine that the target adjustment manner is the second reactive power adjustment manner when the communication interface module receives the first reactive power control packet and the first reactive power control packet has the second packet format.

15. The system of claim 12, wherein the first power control packet comprises a first active power control packet or a first reactive power control packet, and wherein the communication interface module is further configured to:

determine that the target adjustment manner is the first active power adjustment manner when the communication interface module receives the first active power control packet and the first active power control packet carries a first packet identifier;

determine that the target adjustment manner is the second active power adjustment manner when the communication interface module receives the first active power control packet and the first active power control packet carries a second packet identifier;

determine that the target adjustment manner is the first reactive power adjustment manner when the communication interface module receives the first reactive power control packet and the first reactive power control packet carries the first packet identifier; and determine that the target adjustment manner is the second reactive power adjustment manner when the communication interface module receives the first reactive power control packet and the first reactive power control packet carries the second packet identifier.

16. An apparatus, comprising:

an input configured to:

couple to a plurality of power supply modules; and receive a direct current (DC) from the plurality of power supply modules;

an output configured to:

couple to an alternating-current (AC) power grid; and transmit, through a grid-tied point, an AC to the AC power grid; and circuitry coupled to the input and the output and configured to:

convert the DC into the AC;

receive, through a communication transmission medium, a power control packet, wherein the power control packet comprises a power parameter;

determine, based on the power parameter, target power;

determine, based on the power control packet or the communication transmission medium and from at least four adjustment manners, a target adjustment manner corresponding to the power control packet, wherein the target power comprises target active power or target reactive power, and wherein the at least four adjustment manners comprise a first active power adjustment manner and a second active power adjustment manner that correspond to the target active power, and a first reactive power adjustment manner and a second reactive power adjustment manner that correspond to the target reactive power; and adjust, to the target active power or the target reactive power in the target adjustment manner, power to be output by the apparatus to the AC power grid, wherein a first adjustment response time for adjusting, to the target active power in the first active power adjustment manner, the power is less than a second adjustment response time for adjusting, to the target active power in the second active power adjustment manner, the power, and wherein a third adjustment response time for adjusting, to the target reactive power in the first reactive power adjustment manner, the power is less than a fourth adjustment response time for adjusting, to the target reactive power in the second reactive power adjustment manner, the power.

17. The apparatus of claim 16, wherein the circuitry is further configured to:

receive, from a controller, the power control packet, wherein the power control packet comprises an active power control packet or a reactive power control packet;

determine that the target adjustment manner is the first active power adjustment manner when the apparatus receives the active power control packet through a first communication transmission medium;

determine that the target adjustment manner is the second active power adjustment manner when the apparatus receives the active power control packet through a second communication transmission medium;

determine that the target adjustment manner is the first reactive power adjustment manner when the apparatus receives the reactive power control packet through the first communication transmission medium; and determine that the target adjustment manner is the second reactive power adjustment manner when the apparatus receives the reactive power control packet through the second communication transmission medium.

18. The apparatus of claim 16, wherein the circuitry is further configured to:

receive, from a controller, the power control packet, wherein the power control packet comprises an active power control packet or a reactive power control packet;

determine that the target adjustment manner is the first active power adjustment manner when the apparatus receives the active power control packet and the active power control packet has a first packet format;

determine that the target adjustment manner is the second active power adjustment manner when the apparatus receives the active power control packet and the active power control packet has a second packet format;

determine that the target adjustment manner is the first reactive power adjustment manner when the apparatus receives the reactive power control packet and the reactive power control packet has the first packet format; and determine that the target adjustment manner is the second reactive power adjustment manner when the apparatus receives the reactive power control packet and the reactive power control packet has the second packet format.

* * * * *